United States Patent
Edge et al.

(10) Patent No.: US 9,788,181 B2
(45) Date of Patent: Oct. 10, 2017

(54) VOIP EMERGENCY CALL SUPPORT

(71) Applicant: QUALCOMM Incorporated, San Diego, CA (US)

(72) Inventors: Stephen William Edge, Escondido, CA (US); Kirk Allan Burroughs, San Diego, CA (US); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/482,991

(22) Filed: Sep. 10, 2014

(65) Prior Publication Data

US 2014/0376414 A1 Dec. 25, 2014

Related U.S. Application Data

(63) Continuation of application No. 11/497,703, filed on Aug. 1, 2006.

(Continued)

(51) Int. Cl.
*H04W 4/22* (2009.01)
*H04L 29/06* (2006.01)
(Continued)

(52) U.S. Cl.
CPC .............. *H04W 4/22* (2013.01); *G08B 25/10* (2013.01); *H04L 29/06027* (2013.01);
(Continued)

(58) Field of Classification Search
CPC ......... H04L 29/06027; H04L 65/1006; H04W 4/22; H04W 76/007; H04W 80/06; H04W 8/205
See application file for complete search history.

(56) References Cited

U.S. PATENT DOCUMENTS 5,155,165 A  10/1992 Maruyama et al.
5,712,900 A   1/1998 Maupin et al.
(Continued)

FOREIGN PATENT DOCUMENTS

CA    2523923     6/2005
CN    1359585 A   7/2002
(Continued)

OTHER PUBLICATIONS

International Search Report, PCT/US2006/030349—International Search Authority—European Patent Office—dated Jan. 19, 2007.
(Continued)

*Primary Examiner* — Khaled Kassim

(57) ABSTRACT

Techniques to support emergency voice-over-Internet Protocol (VoIP) calls are described. The techniques may be used for various 3GPP and 3GPP2 networks, various location architectures, and various types of User Equipment (UE). A UE communicates with a visited network to send a request to establish an emergency VoIP call. The UE interacts with a location server instructed by the visited network to obtain a first position estimate for the UE. The UE performs call setup via the visited network to establish the emergency VoIP call with a PSAP, which may be selected based on the first position estimate. The UE may thereafter perform positioning with the location server to obtain an updated position estimate for the UE, e.g., if requested by the PSAP.

16 Claims, 12 Drawing Sheets

Related U.S. Application Data

(60) Provisional application No. 60/704,977, filed on Aug. 2, 2005, provisional application No. 60/713,199, filed on Aug. 30, 2005, provisional application No. 60/726,694, filed on Oct. 13, 2005, provisional application No. 60/732,226, filed on Oct. 31, 2005, provisional application No. 60/748,821, filed on Dec. 9, 2005.

(51) Int. Cl.

| | | |
|---|---|---|
| *H04M 1/725* | (2006.01) | |
| *H04M 3/51* | (2006.01) | |
| *H04M 11/04* | (2006.01) | |
| *H04W 8/20* | (2009.01) | |
| *G08B 25/10* | (2006.01) | |
| *H04M 7/00* | (2006.01) | |
| *H04M 1/253* | (2006.01) | |
| *H04M 3/436* | (2006.01) | |
| *H04W 76/00* | (2009.01) | |
| *H04W 80/06* | (2009.01) | |

(52) U.S. Cl.
CPC ...... *H04L 65/1006* (2013.01); *H04L 65/1069* (2013.01); *H04L 65/4007* (2013.01); *H04L 69/164* (2013.01); *H04M 1/72536* (2013.01); *H04M 3/5116* (2013.01); *H04M 7/006* (2013.01); *H04M 11/04* (2013.01); *H04W 8/205* (2013.01); *H04L 69/16* (2013.01); *H04M 1/2535* (2013.01); *H04M 3/436* (2013.01); *H04M 2242/04* (2013.01); *H04M 2242/14* (2013.01); *H04M 2242/30* (2013.01); *H04W 76/007* (2013.01); *H04W 80/06* (2013.01)

(56) References Cited

U.S. PATENT DOCUMENTS

| | | | |
|---|---|---|---|
| 6,058,311 A | 5/2000 | Tsukagoshi | |
| 6,707,888 B1 | 3/2004 | Cope | |
| 6,771,742 B2 | 8/2004 | McCalmont et al. | |
| 7,155,201 B2 | 12/2006 | Lugo Saucedo et al. | |
| 7,218,940 B2 | 5/2007 | Niemenmaa et al. | |
| 7,602,886 B1 | 10/2009 | Beech et al. | |
| 7,623,447 B1 | 11/2009 | Faccin et al. | |
| 7,742,578 B1* | 6/2010 | Klesper | H04M 3/5116 370/352 |
| 7,869,817 B2 | 1/2011 | Shim | |
| 8,265,649 B1 | 9/2012 | Moll et al. | |
| 8,340,626 B2 | 12/2012 | Edge | |
| 2002/0137525 A1 | 9/2002 | Fleischer et al. | |
| 2002/0172165 A1 | 11/2002 | Rosen et al. | |
| 2003/0021413 A1* | 1/2003 | Kiiveri et al. | 380/247 |
| 2003/0027569 A1* | 2/2003 | Ejzak | 455/432 |
| 2004/0095932 A1 | 5/2004 | Astarabadi et al. | |
| 2004/0109459 A1 | 6/2004 | Madour et al. | |
| 2004/0121775 A1* | 6/2004 | Ropolyi | H04L 63/00 455/445 |
| 2004/0122934 A1 | 6/2004 | Westman et al. | |
| 2004/0125802 A1 | 7/2004 | Lillie et al. | |
| 2004/0137873 A1 | 7/2004 | Kauppinen et al. | |
| 2004/0157620 A1 | 8/2004 | Nyu | |
| 2004/0162892 A1 | 8/2004 | Hsu | |
| 2004/0190522 A1* | 9/2004 | Aerrabotu et al. | 370/395.3 |
| 2004/0192252 A1* | 9/2004 | Aerrabotu et al. | 455/404.1 |
| 2004/0198311 A1* | 10/2004 | Aerrabotu | H04W 4/22 455/404.1 |
| 2004/0203566 A1 | 10/2004 | Leung | |
| 2004/0203914 A1 | 10/2004 | Kall et al. | |
| 2004/0242238 A1 | 12/2004 | Wang et al. | |
| 2005/0003829 A1* | 1/2005 | Lala et al. | 455/456.1 |
| 2005/0043008 A1* | 2/2005 | Hurita | H04W 4/22 455/404.1 |
| 2005/0090225 A1 | 4/2005 | Muehleisen et al. | |
| 2005/0130659 A1 | 6/2005 | Grech et al. | |
| 2005/0153687 A1 | 7/2005 | Niemenmaa et al. | |
| 2005/0190892 A1 | 9/2005 | Dawson et al. | |
| 2005/0213565 A1 | 9/2005 | Barclay et al. | |
| 2005/0213716 A1 | 9/2005 | Zhu et al. | |
| 2005/0233727 A1 | 10/2005 | Poikselka et al. | |
| 2005/0239480 A1 | 10/2005 | Kim et al. | |
| 2005/0250516 A1 | 11/2005 | Shim | |
| 2005/0255857 A1 | 11/2005 | Kim et al. | |
| 2006/0014517 A1 | 1/2006 | Barclay et al. | |
| 2006/0072542 A1 | 4/2006 | Sinnreich et al. | |
| 2006/0154645 A1 | 7/2006 | Valkenburg | |
| 2006/0174009 A1* | 8/2006 | Martiquet | H04W 76/022 709/227 |
| 2006/0194594 A1 | 8/2006 | Ruutu et al. | |
| 2006/0258371 A1 | 11/2006 | Krishnamurthi et al. | |
| 2006/0274696 A1 | 12/2006 | Krishnamurthi | |
| 2006/0276168 A1 | 12/2006 | Fuller et al. | |
| 2007/0003024 A1 | 1/2007 | Olivier et al. | |
| 2007/0004378 A1 | 1/2007 | Muhonen | |
| 2007/0060097 A1 | 3/2007 | Edge et al. | |
| 2007/0066277 A1 | 3/2007 | Bharatia et al. | |
| 2007/0121560 A1 | 5/2007 | Edge | |
| 2007/0135089 A1 | 6/2007 | Edge et al. | |
| 2007/0184854 A1 | 8/2007 | Niemenmaa et al. | |
| 2007/0190968 A1 | 8/2007 | Dickinson et al. | |
| 2008/0008157 A1 | 1/2008 | Edge et al. | |
| 2008/0261557 A1* | 10/2008 | Sim | H04W 4/001 455/404.2 |
| 2010/0067444 A1 | 3/2010 | Faccin et al. | |

FOREIGN PATENT DOCUMENTS

| | | |
|---|---|---|
| CN | 1422507 A | 6/2003 |
| CN | 1474577 A | 2/2004 |
| EP | 0789498 A2 | 8/1997 |
| EP | 0917378 A2 | 5/1999 |
| EP | 1526697 A2 | 4/2005 |
| EP | 1422909 B1 | 4/2006 |
| JP | 2001509973 A | 7/2001 |
| JP | 2003516669 A | 5/2003 |
| JP | 2003198757 A | 7/2003 |
| JP | 2003319437 A | 11/2003 |
| JP | 2004502387 A | 1/2004 |
| JP | 2004120715 A | 4/2004 |
| JP | 2004535645 A | 11/2004 |
| JP | 2005525030 A | 8/2005 |
| JP | 2005268894 A | 9/2005 |
| JP | 2006005504 A | 1/2006 |
| JP | 2006014190 A | 1/2006 |
| JP | 2006033004 A | 2/2006 |
| JP | 2006080962 A | 3/2006 |
| JP | 2006101516 A | 4/2006 |
| JP | 2006121526 A | 5/2006 |
| JP | 2007513580 A | 5/2007 |
| RU | 2073913 | 2/1997 |
| RU | 2002129896 | 3/2004 |
| RU | 2292670 | 6/2005 |
| WO | WO-0203718 A2 | 1/2002 |
| WO | WO-02065791 A1 | 8/2002 |
| WO | WO-02093953 | 11/2002 |
| WO | WO-03045084 A2 | 5/2003 |
| WO | WO-03094563 A1 | 11/2003 |
| WO | WO-2004080096 | 9/2004 |
| WO | WO-2004086772 A2 | 10/2004 |
| WO | WO-2005039223 A1 | 4/2005 |
| WO | WO-2005039227 A1 | 4/2005 |
| WO | WO-2005057884 A2 | 6/2005 |
| WO | WO-2005069671 A1 | 7/2005 |

(56) References Cited

FOREIGN PATENT DOCUMENTS

| WO | WO-2007043772 A1 | 4/2007 |
|---|---|---|
| WO | WO-2007127991 | 11/2007 |

OTHER PUBLICATIONS

3GGP2, "Introduction to cdma2000 Standards for Spread Spectrum Systems, Release D," 3GPP2 C.S0001-D, Version 2, pp. 1-16 (Sep. 2005).
3GPP, "3rd Generation Partnership Project; Technical Specification Group GSM/EDGE Radio Access Network; Functional Stage 2 description of Location Services (LCS) in GERAN (Release 7)," 3GPP TS 43.059 v7.0.0, pp. 1-67 (Apr. 2005).
3GPP, "3rd Generation Partnership Project; Technical Specification Group GSM/EDGE Radio Access Network; Generic access to the A/Gb interface; Stage 2", 3GPP TS 43.318 v6.7.0, pp. 1-71 (Jun. 2006).
3GPP, "3rd Generation Partnership Project; Technical Specification Group Radio Access Network; Stage 2 functional specification of User Equipment (UE) positioning in UTRAN (Release 6)," 3GPP TS 25.305 v6.1.0, pp. 1-54 (Jun. 2004).
3GPP, "3rd Generation Partnership Project; Technical Specification Group Services and System Aspects; Generic Authentication Architecture (GAA); Generic bootstrapping architecture (Release 7)," 3GPP TS 33.220 v7.5.0, pp. 1-71 (Sep. 2006).
3GPP, "3rd Generation Partnership Project; Technical Specification Group Services and Systems Aspects; Generic Authentication Architecture (GAA); Access to network application functions using Hypertext Transfer Protocol over Transport Layer Security (HTTPS)(Release 7)," 3GPP TS 33.222 v7.2.0, pp. 1-21 (Sep. 2006).
3GPP TS 23.167 v7.1.0 (Jun. 2006); Technical Specification Group Services and System Aspects; IP Multimedia Subsystem (IMS) emergency sessions (Release 7), Jun. 13, 2006, pp. 1-33, XP002468569.
3GPP TS 23.271 v7.1.0; "3rd Generation Partnership Project; Technical Specification Group Services and System Aspects; Functional stage 2 description of Location Services (LCS)," 3GPP TS 23.271 version 7.1.0 Release 7 (Jun. 2005).
3GPP2 C.S0024-A, "cdma 2000 High Rate Packet Data Air Interface Specification," Version 2.0, pp. 1-1227 (Jul. 2005).
3GPP2, "IP-Based Location Service. Revision 0" 3GPP2 X.50024-0, Version 1.0, pp. 1-215 (Oct. 2005).
3GPP2, "IP-Based Location Services Security Framework," 3GPP2 S.S0110-0, Version 1.0, pp. 1-60 (Feb. 2006).
3GPP2, "MAP Location Services Enhancements," 3GPP2 X.50002-0, Version 2.0, pp. 1-234 (May 2006).
3rd Generation Partnership Project 2 "3GPP2": "TIA/EIA-41-D Location Services Enhancements," 3GPP2 X.S0002, Version 1.0.0, pp. 1-234 (Mar. 2004).
3rd Generation Partnership Project; Technical Specification Group Services and System Aspects; Internet Protocol (IP) based IP Multimedia Subsystem (IMS) emergency sessions; (Release 7), 3GPP TR 23.867 V1.0.0, May 2005.
3rd Generation Partnership Project; Technical Specification Group Services and System Aspects; Internet Protocol (IP) based IP Multimedia Subsystem (IMS) emergency sessions; (Release 7), 3GPP TR 23.867 V2.0.0, pp. 1-80, May 2005.
Abbott, N.: "Alternatives for Providing Routing and Location Information to Support Emergency Calling from IP Enterprises", NENA Technical Information Document, pp. 1-16, XP002323684 (Oct. 3, 2003).
CDMA2000.
Dierks, et al., "The TLS Protocol", Version 1.0, Network Working Group, Request for Comments 2246, pp. 1-80 (Jan. 1999).
EIA/TIA Interim Standard, "Cellular System Dual-Mode Mobile Station—Base Station Compatibility Standard," IS-54, pp. 1-226 (May 1990).
Eronen, P., et al., "Pre-Shared Key Ciphersuites for Transport Layer Security (TLS); rfc4279.txt", Dec. 1, 2005, Dec. 1, 2005 (Dec. 1, 2005), XP015043208, ISSN: 0009-0003 p. 6, paragraph 3-p. 7.
European Search Report, EP12000669—International Search Authority —Munich—Oct. 4, 2012.
Joint Standard, "Enhanced Wireless 9-1-1 Phase 2," J-STD-036-A (Revision of IS-J-STD-036) pp. 1-294 (Jun. 2002).
Lucent Technologies: "Location for IMS Emergency Calls", 3GPP TSG SA WG2 Architecture—52#45, S2-050605, pp. 1-9, Apr. 8, 2005.
OMA-AD-SULP-V2_0-20060704-D, "Secure User Plane Location Architecture" Draft Version 4.0, July 4, 2006.
OMA-TS-ULP-V2_0-20060721-D"User Plane Protocol" Draft Version 2.0, Jul. 21, 2006.
Open Mobile Alliance, "Secure User Plane Location Architecture, Candidate Version 1.0," OMA-AD-SUPL-V1_0-20060906-C, pp. 1-80 (Sep. 2006).
Open Mobile Alliance, "Secure User Plane Location Architecture, Draft Version 2.0," OMA-AD-SUP-V2_0-20060823-D, pp. 1-54 (Aug. 2006).
Open Mobile Alliance, "UserPlane Location Protocol Draft Version 2.0," OMA-TS-ULP-V2_0-20060907-D, pp. 1-243 (Sep. 2006).
Qualcomm: "VoIP Emergency Call Support," 3GPP TSG SA WG2 Architecture—S2#48, pp. 1-23, S2-051950 (Sep. 2005).
Schulzrinne H: "Emergency Services for Internet Telephony Systems; draft —schulzrinne-sipping-emergency-arch-02", Ietf Standard-Working-Draft, Internet Engineering Task Force, IETF, CH, No. 2, Oct. 18, 2004 (Oct. 18, 2014), XP015039663, ISSN: 0000-0004.
Taiwanese Search report—095128345—TIPO—dated Jun. 11, 2010.
TIA/EIA Standard, "Mobile Station-Base Station Compatibility Standard for Wideband Spread Spectrum Cellular Systems," TIA/EIA-95-B (Upgrade and Revision of TIA/EIA-95-A), pp. 1-1206 (Mar. 1999).
Universal Mobile Telecommunications System (UMTS); UTRAN lub and lur interface user plane protocol for DCH data streams (3GPP TS 25.427 version 5.0.0 Release 5), ETSI TS 125 427 V5.0.0., pp. 1-35 (Mar. 2002).
Written Opinion—PCT/US2006/030349, International Search Authority—European Patent Office—dated Jan. 19, 2007.
ETSI TS 102 164: "Telecommunications and Internet Converged Services and Protocols for Advanced Networking (TISPAN); Emergency Location Protocols", Version 1.2.2, May 1, 2004, pp. 1-26.

* cited by examiner

VOIP EMERGENCY CALL SUPPORT

This application is a continuation of U.S. application Ser. No. 11/497,703, filed Aug. 1, 2006, entitled "VOIP Emergency Call Support," which claims the benefit of U.S. Provisional Application No. 60/704,977, entitled "VOICE-OVER INTERNET PROTOCOL EMERGENCY CALL SUPPORT," filed Aug. 2, 2005, U.S. Provisional Application No. 60/713,199, entitled "VOIP EMERGENCY CALL SUPPORT," filed Aug. 30, 2005, U.S. Provisional Application Ser. No. 60/726,694, entitled "VOIP EMERGENCY CALL SUPPORT," filed Oct. 13, 2005, U.S. Provisional Application No. 60/732,226, filed Oct. 31, 2005, entitled "VOIP EMERGENCY CALL SUPPORT," and U.S. Provisional Application No. 60/748,821, entitled "SUPPORT FOR EMERGENCY VoIP CALLS USING SUPL," filed Dec. 9, 2005, all assigned to the assignee hereof and incorporated herein by reference.

BACKGROUND

1.1. Field

The present disclosure relates generally to communication, and more specifically to techniques for supporting emergency calls.

1.2. Background

Wireless communication networks are widely deployed to provide various communication services such as voice, video, packet data, messaging, broadcast, and so on. These wireless networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, and Orthogonal FDMA (OFDMA) networks.

Wireless networks typically support communication for wireless users that have service subscriptions with these networks. A service subscription may be associated with information for security, routing, quality of service (QoS), billing, and so on. The subscription-related information may be used to establish calls with a wireless network.

One of the most basic services provided by wireless networks for its users is the ability to send and receive voice calls. One recent enhancement of this service is the ability to send and receive Voice over Internet Protocol (VoIP) calls. A VoIP call is a voice call in which voice data is sent in packets that are routed like other packet data instead of on dedicated traffic channel.

A wireless user may place an emergency voice or other media call with a wireless network that may or may not be a home network with which the user has service subscription. Such a call may use VoIP. A major challenge is to route the emergency call to an appropriate Public Safety Answering Point (PSAP) that can service the call. This may entail obtaining an interim position estimate for the user and determining the proper PSAP based on the interim position estimate. The problem is compounded if the user is roaming and/or has no service subscription with any network.

There is therefore a need in the art for techniques to support emergency calls and emergency VoIP calls.

SUMMARY

Techniques to support emergency Voice-over-Internet Protocol (VoIP) calls are described herein. The techniques may be used for various 3GPP and 3GPP2 networks, various location architectures, and User Equipments (UEs) with and without service subscription.

In an embodiment, a UE communicates with a visited network to send a request to establish an emergency VoIP call. The UE interacts with a location server instructed by the visited network to obtain a first position estimate for the UE. The UE performs call setup via the visited network to establish the emergency VoIP call with a PSAP, which may be selected based on the initial position estimate. The UE may thereafter perform positioning with the location server to obtain an updated position estimate for the UE, e.g., if requested by the PSAP. Various details of the emergency VoIP call are described below.

Various aspects and embodiments of the disclosure are also described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Techniques for supporting emergency VoIP calls are described herein. An emergency VoIP call is a VoIP call or a packet-switched call for emergency services. An emergency VoIP call may be identified as such and may be distinguished from a normal VoIP call in several manners, as described below. An emergency VoIP call may be associated with various characteristics that are different from an ordinary VoIP call such as, e.g., obtaining a suitable position estimate for a user, routing the emergency VoIP call to an appropriate PSAP, and so on. A position estimate is also referred to as a location estimate, a position fix, and so on.

Figure 1:
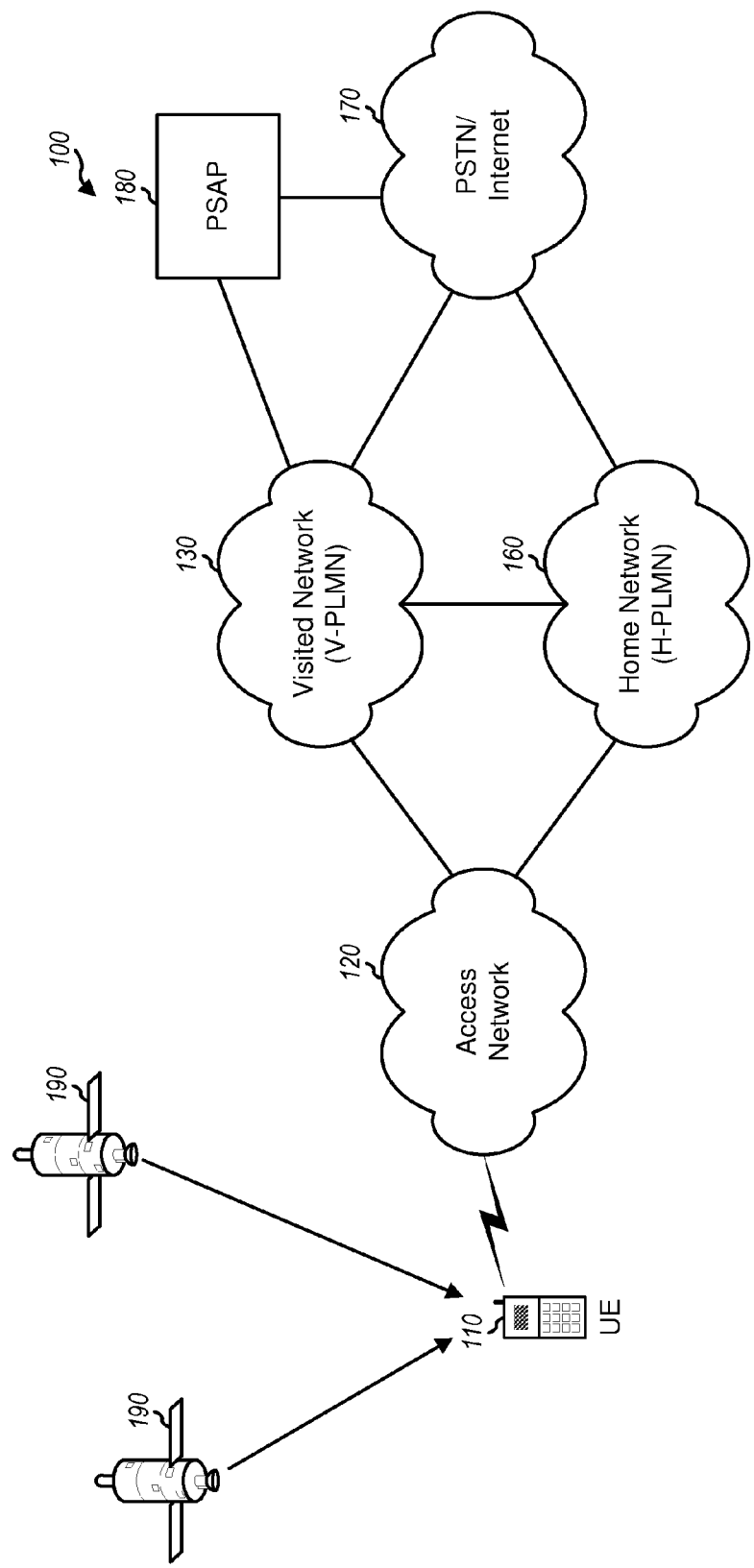
FIG. 1 shows a deployment that supports emergency VoIP calls.

FIG. 1 shows a deployment 100 that supports emergency VoIP calls. A User Equipment (UE) 110 communicates with an access network 120 to obtain basic IP communication services. UE 110 may be stationary or mobile and may also be called a mobile station (MS), a terminal, a subscriber unit, a station, or some other terminology. UE 110 may be a cellular phone, a personal digital assistant (PDA), a wireless device, a laptop computer, a telemetry device, a tracking device, and so on. UE 110 may communicate with one or more base stations and/or one or more access points in access network 120. UE 110 may also receive signals from one or more satellites 190, which may be part of the Global Positioning System (GPS), the European Galileo system, the Russian GLONASS system, or any Global Navigation Satellite System (GNSS). UE 110 may measure signals from base stations in access network 120 and/or signals from satellites 190 and may obtain pseudo-range measurements for the satellites and/or timing measurements for the base stations. The pseudo-range measurements and/or timing measurements may be used to derive a position estimate for UE 110 using one of or a combination of positioning methods well known in the art such as assisted GPS (A-GPS), standalone GPS, Advanced Forward Link Trilateration (A-FLT), Enhanced Observed Time Difference (E-OTD), Observed Time Difference Of Arrival (OTDOA), Enhanced Cell ID, and so on.

Access network 120 provides radio communication for UEs located within the coverage area of the access network. Access network 120 may include base stations, network controllers, and/or other entities, as described below. A visited network 130, which is also called a Visited Public Land Mobile Network (V-PLMN), is a network currently serving UE 110. A home network 160, which is also called a Home PLMN (H-PLMN), is a network with which UE 110 has subscription. Access network 120 is associated with visited network 130. Visited network 130 and home network 160 may also be the same or different networks. Visited network 130 and home network 160 may or may not have roaming agreement. Networks 130 and 160 may each comprise entities that provide data connectivity, location services, and/or other functionalities and services.

A network 170 may include a Public Switched Telephone Network (PSTN), the Internet, and/or other voice and data networks. A PSTN supports communication for conventional plain old telephone service (POTS). A PSAP 180 is an entity responsible for answering emergency calls (e.g., for police, fire, and medical services) and may also be referred to as an Emergency Center (EC). Such calls may be initiated when the user dials some fixed well-known number such as 911 in North America or 112 in Europe. PSAP 180 is typically operated or owned by a government agency, e.g., county or city. PSAP 180 may support IP connectivity for VoIP calls and thus support Session Initiation Protocol (SIP), which is a signaling protocol for initiating, modifying, and terminating interactive user sessions based on IP such as VoIP. Alternatively or additionally, PSAP 180 may support communication with PSTN 170.

The techniques described herein may be used for emergency VoIP calls originated from wireline networks such as DSL and cable and for emergency VoIP calls originated from wireless wide area networks (WWANs), wireless local area networks (WLANs), wireless metropolitan networks (WMANs), and wireless networks with WWAN and WLAN coverage. The WWANs may be CDMA, TDMA, FDMA, OFDMA and/or other networks. A CDMA network may implement one or more radio technologies such as Wideband-CDMA (W-CDMA), cdma2000, and so on. cdma2000 covers IS-2000, IS-856, and IS-95 standards and includes Ev-DO revisions to optimize IP support. A TDMA network may implement one or more radio technologies such as Global System for Mobile Communications (GSM), Digital Advanced Mobile Phone System (D-AMPS), and so on. D-AMPS covers IS-248 and IS-54. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. A WLAN may implement a radio technology such as IEEE 802.11. A WMAN may implement a radio technology such as IEEE 802.16. These various radio technologies and standards are known in the art.

Figure 2:
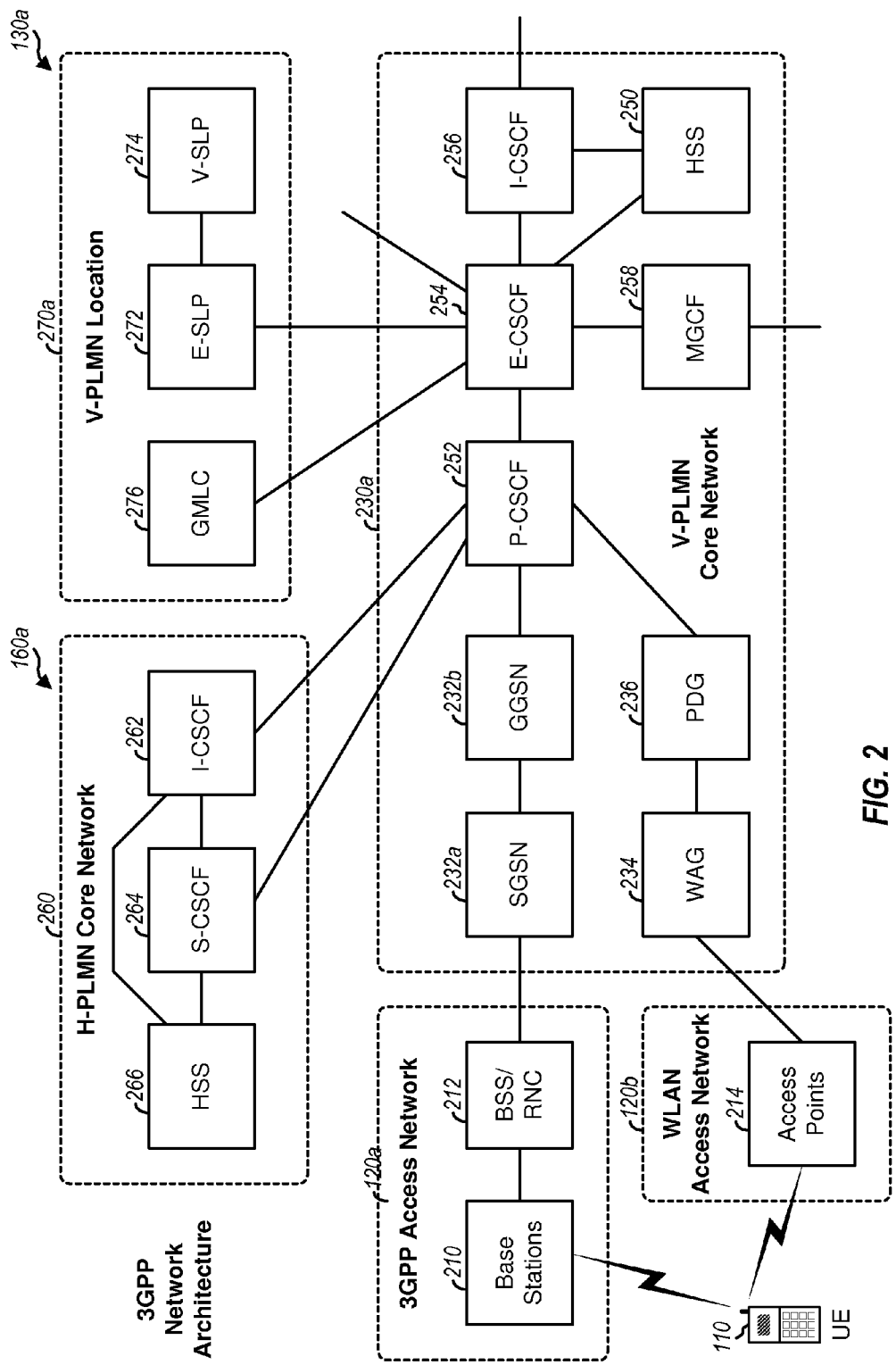
FIG. 2 shows a 3GPP network architecture.

FIG. 2 shows a 3GPP network architecture. UE 110 may gain radio access via a 3GPP access network 120a or a WLAN access network 120b. 3GPP access network 120a may be a GSM EDGE Radio Access Network (GERAN), a Universal Terrestrial Radio Access Network (UTRAN), an Evolved UTRAN (E-UTRAN), or some other access network. 3GPP access network 120a includes base stations 210, a Base Station Subsystem (BSS)/Radio Network Controller (RNC) 212, and other entities not shown in FIG. 2. A base station is also referred to as a Node B, an enhanced Node B (e-Node B), a Base Transceiver Station (BTS), an access point (AP), or some other terminology. WLAN 120b includes access points 214 and may be any WLAN.

A V-PLMN 130a is one embodiment of visited network 130 in FIG. 1 and includes a V-PLMN core network 230a and V-PLMN location entities 270a. V-PLMN core network 230a includes a Serving GPRS Support Node (SGSN) 232a, a Gateway GPRS Support Node (GGSN) 232b, a WLAN Access Gateway (WAG) 234, and a Packet Data Gateway (PDG) 236. SGSN 232a and GGSN 232b are part of a General Packet Radio Service (GPRS) core network and provide packet-switched services for UEs communicating with 3GPP access network 120a. WAG 234 and PDG 236 are part of a 3GPP Interworking WLAN (I-WLAN) core network and provide packet-switched services for UEs communicating with WLAN 120b.

V-PLMN core network 230a also includes a Home Subscriber Server (HSS) 250 and various IP Multimedia Subsystem (IMS) entities including a Proxy Call Session Control Function (P-CSCF) 252, an Emergency CSCF (E-CSCF) 254, an Interrogating CSCF (I-CSCF) 256, and a Media Gateway Control Function (MGCF) 258. P-CSCF 252, E-CSCF 254, I-CSCF 256 and MGCF 258 support IMS services, e.g., VoIP calls, and are part of a V-PLMN IMS network. P-CSCF 252 accepts requests from UEs and services these requests internally or forwards the requests to other entities, possibly after translation. E-CSCF 254 performs session control services for the UEs and maintains session state used to support IMS emergency services. E-CSCF 254 further supports emergency VoIP calls. MGCF 258 directs signaling conversion between SIP/IP and PSTN (e.g., SS7 ISUP) and is used whenever a VoIP call from one user goes to a PSTN user. HSS 250 stores subscription-related information for UEs for which V-PLMN 130a is the home network.

V-PLMN location entities 270a may include an Emergency Services SUPL Location Platform (E-SLP) 272 and a Visiting SLP (V-SLP) 274, which support OMA Secure User Plane Location (SUPL). V-SLP 274 may be within or associated with a different network to V-PLMN 130a and/or may be geographically closer to UE 110. Alternatively or additionally, V-PLMN location entities 270a may include a Gateway Mobile Location Center (GMLC) 276, which is part of 3GPP control plane location. E-SLP 272, V-SLP 274 and GMLC 276 provide location services for UEs in communication with V-PLMN 130a.

An H-PLMN 160a is one embodiment of home network 160 in FIG. 1 and includes an H-PLMN core network 260. H-PLMN core network 260 includes an HSS 266 and further includes IMS entities such as an I-CSCF 262 and a Serving CSCF (S-CSCF) 264 that support IMS for home network 160. I-CSCF 262 and S-CSCF 264 are part of an H-PLMN IMS network.

Figure 3:
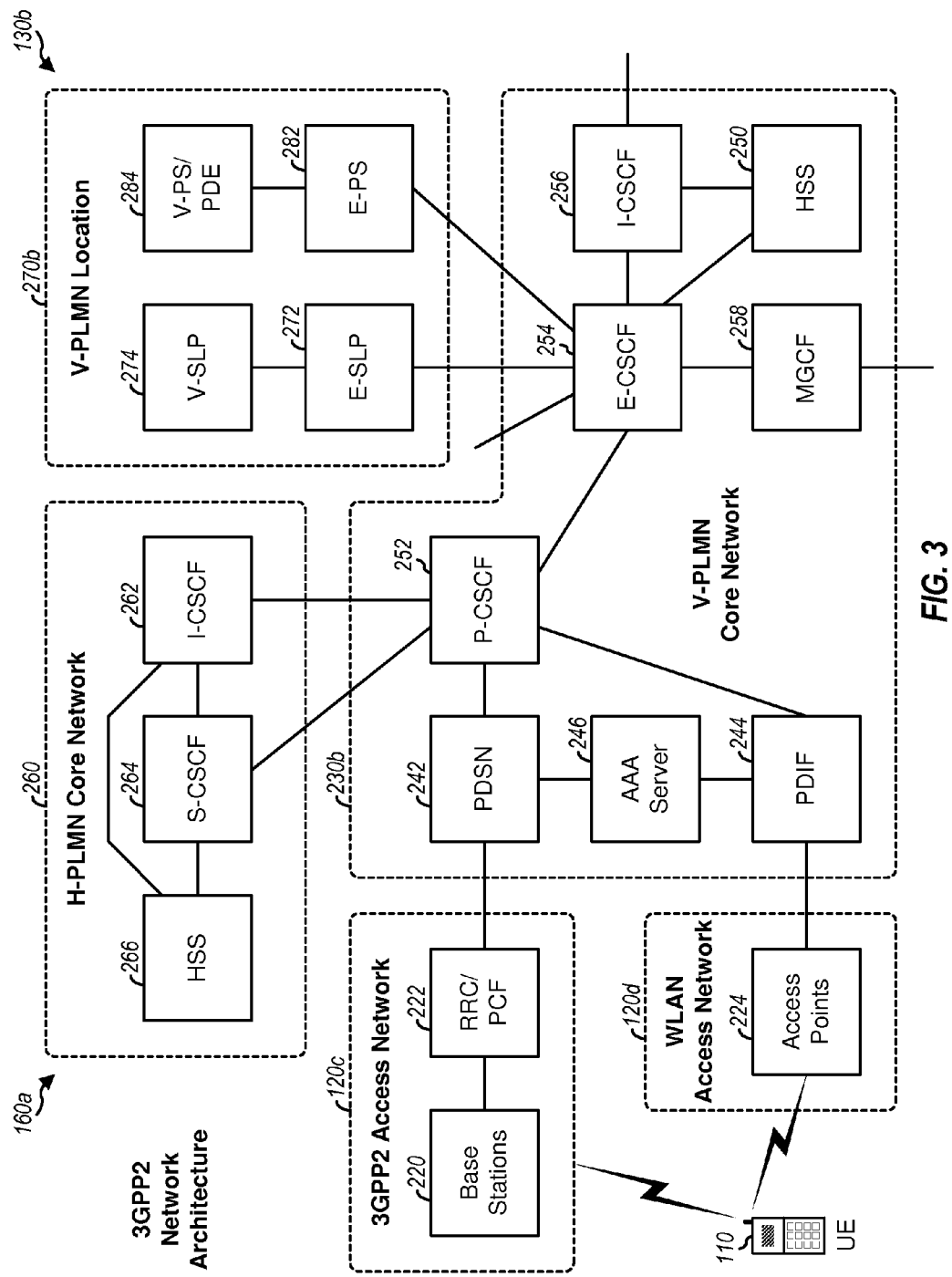
FIG. 3 shows a 3GPP2 network architecture.

FIG. 3 shows a 3GPP2 network architecture. UE 110 may gain radio access via a 3GPP2 access network 120c or a WLAN access network 120d. 3GPP2 access network 120c may be a CDMA2000 1x network, a CDMA2000 1xEV-DO network, or some other access network. 3GPP2 access network 120c includes base stations 220, a Radio Resource Control/Packet Control Function (RRC/PCF) 222, and other entities not shown in FIG. 3. RRC may also be called a Radio Network Controller (RNC) or base station. 3GPP2 access network 120c may also be called a Radio Access Network (RAN). WLAN 120d includes access points 224 and may be any WLAN associated with a 3GPP2 network.

A V-PLMN 130b is another embodiment of visited network 130 in FIG. 1 and includes a V-PLMN core network 230b and 3GPP2 location entities 270b. V-PLMN core network 230b includes a Packet Data Serving Node (PDSN) 242, a Packet Data Interworking Function (PDIF) 244, and an Authentication, Authorization and Accounting (AAA) server 246. PDSN 242 and PDIF 244 provide packet-switched services for UEs communicating with 3GPP2 access network 120c and WLAN 120d, respectively. V-PLMN core network 230a also includes IMS or Multimedia Domain (MMD) entities such as P-CSCF 252, E-CSCF 254, I-CSCF 256 and MGCF 258. E-CSCF 258 may also have other names such as ES-AM (Emergency Services Application Manager).

3GPP2 location entities 270b may include E-SLP 272 and V-SLP 274 for SUPL. Alternatively or additionally, 3GPP2 location entities 270b may include an Emergency Services Position Server (E-PS) 282 and a Visited Position Server (V-PS)/Position Determining Entity (PDE) 284, which are part of X.S0024 location for cdma2000 networks. E-PS 282 may also be referred to as a Surrogate Position Server (S-PS). E-SLP 272, V-SLP 274, E-PS 282, and V-PS/PDE 284 provide location services for UEs in communication with V-PLMN 130b.

For simplicity, FIGS. 2 and 3 show only some of the entities in 3GPP and 3GPP2, which are referred to in the description below. 3GPP and 3GPP2 networks may include other entities defined by 3GPP and 3GPP2, respectively.

In the following description, 3GPP networks refer to networks and network subsystems (e.g., access network subsystems) defined by 3GPP as well as other networks and network subsystems (e.g., WLAN) operated in conjunction with 3GPP networks. 3GPP networks and network subsystems may include GERAN, UTRAN, E-UTRAN, GPRS core network, IMS network, 3GPP I-WLAN, and so on. 3GPP2 networks refer to networks and network subsystems defined by 3GPP2 as well as other networks and network subsystems operated in conjunction with 3GPP2 networks. 3GPP2 networks may include CDMA2000 1x, CDMA2000 1xEV-DO, cdma2000 core network, 3GPP2 IMS or MMD network subsystem, 3GPP2 associated WLAN, and so on. For simplicity, "3GPP WLAN" refers to a WLAN associated with a 3GPP network, and "3GPP2 WLAN" refers to a WLAN associated with a 3GPP2 network.

In the following description, GPRS access refers to access to GPRS core network via GERAN, UTRAN, or some other 3GPP access network. 3GPP WLAN access refers to access to 3GPP core network via a WLAN. cdma2000 access refers to access to cdma2000 core network via CDMA2000 1X, CDMA2000 1xEV-DO, or some other 3GPP2 access network. 3GPP2 WLAN access refers to access to 3GPP2 WLAN core network via a WLAN.

For 3GPP, UE 110 may or may not be equipped with a Universal Integrated Circuit Card (UICC). For 3GPP2, UE 110 may or may not be equipped with a User Identity Module (UIM). A UICC or UIM is typically specific to one subscriber and may store personal information, subscription information, and/or other information. A UICC-less UE is a UE without a UICC, and a UIM-less UE is a UE without a UIM. A UICC/UIM-less UE has no subscription, no home network, and no authentication credentials (e.g., no secret key) to verify any claimed identity, which makes location services more risk-prone.

The techniques described herein may be used for various location architectures such as control plane and user plane architectures. A control plane (which is also called a signaling plane) is a mechanism for carrying signaling for higher-layer applications and is typically implemented with network-specific protocols, interfaces and signaling messages. A user plane is a mechanism for carrying signaling for higher-layer applications but employing a user-plane bearer, which is typically implemented with protocols such as User Datagram Protocol (UDP), Transmission Control Protocol (TCP), and Internet Protocol (IP), all of which are known in the art. Messages supporting location services and positioning are carried as part of signaling in a control plane architecture and as part of data (from a network perspective) in a user plane architecture. The content of the messages may, however, be the same or similar in both architectures.

The techniques may be used for various location architectures/solutions such as those listed in Table 1. SUPL and pre-SUPL are described in documents from Open Mobile Alliance (OMA). 3GPP control plane is described in 3GPP TS 23.271, TS 43.059, and TS 25.305. 3GPP2 control plane is described in IS-881 and 3GPP2 X.S0002. 3GPP2 user plane is described in 3GPP2 X.S0024.

TABLE 1

| Location Architecture | Architecture Type | Applicable for . . . |
|---|---|---|
| Pre-SUPL | user plane | 3GPP networks |
| SUPL | user plane | 3GPP and 3GPP2 networks |
| 3GPP control plane | control plane | 3GPP networks |
| 3GPP2 control plane | control plane | 3GPP2 networks |
| X.S0024 | user plane | 3GPP2 networks |

A UE may support zero, one or multiple location solutions (e.g., SUPL, or 3GPP control plane, or SUPL and 3GPP control plane, or SUPL and X.S0024) for emergency VoIP calls. The UE may inform the network of its location capabilities when a call is made, e.g., in a SIP INVITE and/or a SIP REGISTER message. This information may be stored in a local server (e.g., a location server) for retrieval by the network.

The techniques described herein may support the following features.
    (a) Support emergency VoIP calls for mobile, fixed and nomadic users.
    (b) Applicable to VoIP calls using GPRS access, 3GPP WLAN access, cdma2000 access, and 3GPP2 WLAN access.
    (c) Support end-to-end IP connectivity to SIP/IP capable PSAPs.
    (d) Support connectivity to PSTN capable PSAPs, which may be local to the calling UEs but geographically remote from SIP call servers, e.g., when a VoIP service provider is remote from a UE.

(e) Support call routing to a suitable PSAP using an interim position estimate.
(f) Provision of accurate location of the UE to the PSAP.
(g) Support of initial and updated location using various location architectures.
(h) Support emergency VoIP calls from UEs without UICC/UIM and UEs whose H-PLMNs have no roaming agreements with V-PLMNs.
(i) Support callback from a PSAP to a UE without a UICC/UIM and/or without roaming agreement in a V-PLMN.
(j) Compatible with an IETF Ecrit solution and NENA solutions such as Interim VoIP Architecture for Enhanced 9-1-1 Services (i2), also known as NENA 12 solution.
(k) Little impacts and requirements to H-PLMN.

PSAP callback refers to a call from a PSAP back to a UE, e.g., because the emergency call was dropped or released too early. An interim position estimate typically refers to an approximate position used for routing, and an initial position estimate typically refers to the first accurate position estimate. In some cases, the initial position estimate may be obtained after the interim position estimate. In other cases, the interim and initial position estimates may be the same. In yet some other cases, the interim position estimate and/or initial position estimate may not be used.

For SUPL, a Home SLP (H-SLP) in H-PLMN 160 may be bypassed, and one or more V-SLPs and/or E-SLPs in or associated with V-PLMN 130 may be used for location. For X.S0024, a Home PS (H-PS) in H-PLMN 160 may be bypassed, and one or more V-PSs and/or E-PSs in or associated with V-PLMN 130 may be used for location. This implies some changes to SUPL and X.S0024, e.g., the H-SLP or H-PS configured in UE 110 may be overridden for location during an emergency call. The use of V-SLP(s), E-SLPs, E-PSs or V-PS(s) in V-PLMN 130 may be desirable for the following reasons:

(a) Specialized emergency call support in particular regions or countries should utilize support from only networks in those regions and not other networks.
(b) A UE without a UICC/UIM may have no H-PLMN and may rely on an SLP or PS in the V-PLMN.
(c) For a UE with a UICC/UIM, the H-PLMN may have no roaming agreements with the V-PLMN, and it may be difficult to use the H-SLP or H-PS.
(d) The H-SLP or H-PS may not support a location request from a remote PSAP (e.g., in another country) due to signaling differences and lack of registration.
(e) The H-SLP or H-PS may not be able to obtain a good position estimate (e.g., if the H-SLP or H-PS is remote from the UE) without assistance of a V-SLP or V-PS in the V-PLMN.
(f) The H-SLP or H-PS may not support an interface (e.g., a Li or LCS-i interface) used by the E-SLP or E-PS to support emergency call services.

E-SLP 272 or E-PS 282 may perform positioning for UE 110 in SUPL and X.S0024, respectively. Alternatively, a V-SLP, V-PS, or PDE may be selected to perform positioning for UE 110, e.g., if E-SLP 272 or E-PS 282 is not able to perform this function. A V-SLP, V-PS, or PDE may be useful, e.g., if a SIP call server (e.g., E-CSCF 254) is remote from UE 110 and selects an E-SLP or E-PS that is also remote, which may occur when an operator uses a small number of call servers to service a large region or an entire country. E-SLP 272 or E-PS 282 may select an appropriate V-SLP, V-PS, or PDE using any of the following mechanisms:

(a) UE 110 discovers an IP address or name of a V-SLP or V-PS when attaching to an access network or establishing IP connectivity, e.g., the access network provides the V-SLP or V-PS address to UE 110. UE 110 may also discover the V-SLP or V-PS address by a DNS query after establishing IP connectivity. This may be applicable if a DNS server used by UE 110 is more local to UE 110 than E-CSCF 254. UE 110 may include the V-SLP or V-PS address in an initial SIP REGISTER sent to IMS and in any subsequent re-REGISTER following handover to a new access network. IMS (e.g., E-CSCF 254) may transfer the V-SLP or V-PS address to E-SLP 272 or E-PS 282.
(b) E-SLP 272 or E-PS 282 determines the V-SLP or V-PS address based on location information provided by UE 110 in the initial SIP INVITE.
(c) E-SLP 272 or E-PS 282 determines the V-SLP or V-PS address based on location information received from UE 110 in a SUPL START.

In general, the location information provided by UE 110 may be any information that may be used to determine the position of UE 110. The location information may comprise geographic coordinates, GSM, UMTS, or cdma2000 cell identity (ID), cdma2000 serving cell information, WLAN access name identity, WLAN MAC address, and so on. The location information may also comprise measurements that may be used to determine the position of UE 110.

For SUPL and X.S0024, E-SLP 272 or E-PS 282 may send a SUPL INIT to UE 110 to start a SUPL session. The SUPL INIT may be sent using a WAP Push or SMS, which may result in longer delay. In an embodiment, to reduce delay, the SUPL INIT may be sent to UE 110 via IMS (e.g., P-CSCF 252 and E-CSCF 254) using an IMS Immediate message, some other IMS message, a SIP 1xx response (e.g., a 183 Session Progress), or some other message. The use of existing (possibly secure) associations between the IMS and UE 110 enables fast transfer and further avoids additional delay to set up new associations and/or transfer the message through additional entities (e.g., an SMS service center). This embodiment may also be used when UE 110 is not registered in the H-PLMN, e.g., has no UICC or UIM. In another embodiment, to reduce delay, the SUPL INIT may be sent to UE 110 using mobile terminated IP or UDP/IP. In this case, an IP gateway serving UE 110 (e.g., GGSN 232*b*, PDG 236, PDSN 242, or PDIF 244) may be pre-administered with the IP address(es) of E-SLP 272 in order to not filter out IP packets from E-SLP 272 to UE 110. UE 110 may be configured to support a TCP port and/or UDP port used for SUPL (and registered with IANA) for receipt of the SUPL INIT.

Emergency VoIP calls may be supported with SUPL 1.0 and the initial version of X.S0024 (3GPP2 X.S0024-0) as follows.

(a) If UE 110 is in H-PLMN 160, then E-SLP 272 is the H-SLP or E-PS 282 is the H-PS for the UE and invokes a SUPL 1.0 or X.S0024-0 network initiated location request. A SUPL INIT may be sent to UE 110 using SMS or WAP Push.
(b) If UE 110 is not in H-PLMN 160 but is registered in V-PLMN 130, then E-SLP 272 may invoke a SUPL 1.0 location request by acting as a Requesting SLP (R-SLP) and sending the location request to the H-SLP for UE 110 according to the procedure in SUPL 1.0 and OMA RLP. Similarly, E-PS 282 may invoke an X.S0024 location request from the H-PS for UE 110 using, e.g., OMA RLP protocol.

(c) If UE 110 is not in H-PLMN 160 and is not registered in V-PLMN 130 (e.g., no roaming agreement between V-PLMN 130 and H-PLMN 160) or if UE 110 has no UICC or UIM, then SUPL 1.0 or X.S0024-0 location is not supported. However, E-SLP 272 or E-PS 282 may still be able to obtain a position estimate for UE 110 using location information provided by UE 110 in an initial SIP INVITE for an emergency call.

1. Emergency VoIP Call with SUPL

Figure 4:
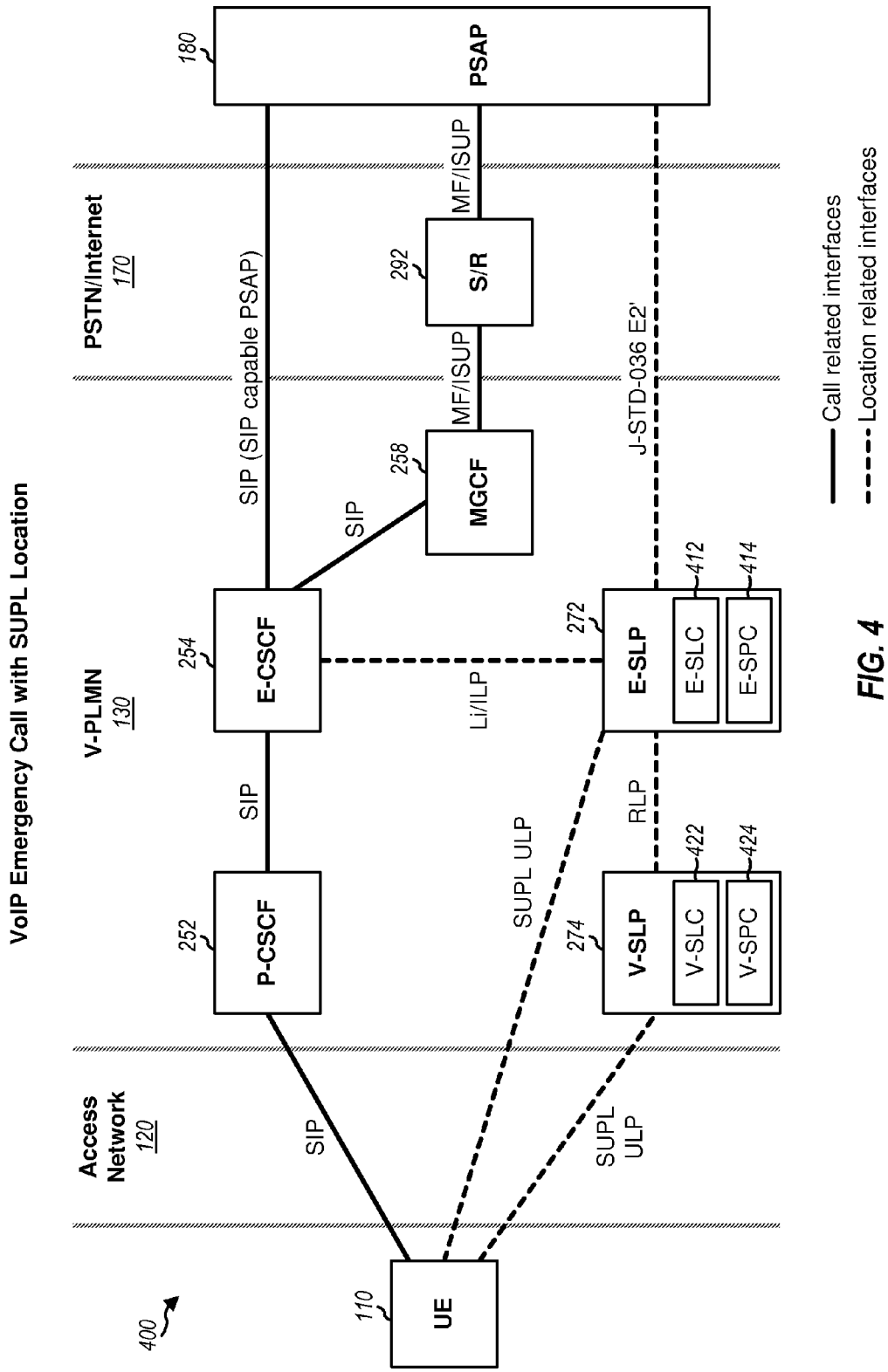
FIGS. 4 and 5 show a network architecture and a message flow, respectively, for emergency VoIP call with SUPL location.

FIG. 4 shows a block diagram of an embodiment of a network architecture 400 for emergency VoIP call with SUPL location. Network architecture 400 is applicable for both 3GPP and 3GPP2 networks. For simplicity, FIG. 4 shows only entities and interfaces relevant to support of emergency VoIP calls using SUPL.

UE 110 is referred to as a SUPL enabled terminal (SET) in SUPL. Access network 120 may be a 3GPP access network, a 3GPP2 access network, a WLAN, or some other network. Access network 120 and/or V-PLMN 130 include entities that support packet-switched calls, e.g., as shown in FIGS. 2 and 3. For 3GPP2, simple IP and/or mobile IP may be used for emergency VoIP calls. In the following description, IMS may refer to P-CSCF 252, E-CSCF 254 and/or MGCF 258.

E-SLP 272 may include a SUPL Location Center (E-SLC) 412 that performs various functions for location services and a SUPL Positioning Center (E-SPC) 414 that supports positioning for UEs. V-SLP 274 may similarly include a V-SLC 422 and a V-SPC 424. E-SLP 272 may substitute for an H-SLP in H-PLMN 160 in case of location for emergency calls. The entities in SUPL are described in a document OMA-AD-SUPL-V2_0-20060704-D, entitled "Secure User Plane Location Architecture," Draft Version 4.0, Jul. 4, 2006, and in document OMA-TS-ULP-V2_0-20060721-D, entitled "User Plane Location Protocol," Draft Version 2.0, Jul. 21, 2006, which are publicly available from OMA.

SUPL supports two communication modes between a SET and an SLP for positioning with an SPC. In a proxy mode, the SPC does not have direct communication with the SET, and the SLP acts as a proxy between the SET and the SPC. In a non-proxy mode, the SPC has direct communication with the SET.

PSTN/Internet 170 may include entities (e.g., routers) that support packet routing and a Selective Router (S/R) 292 that routes an emergency call to a PSAP. S/R 292 may belong to PSAP 180 or may be shared by and connected to a set of individual PSAPs. UE 110 may communicate with PSAP 180 via P-CSCF 252 and E-CSCF 254 for a VoIP call if PSAP 180 supports SIP. UE 110 may also communicate with PSAP 180 via P-CSCF 252, E-CSCF 254, MGCF 258 and S/R 292 if PSAP 180 does not support SIP. In this case, a Media Gateway (MGW) controlled by MGCF 258 performs VoIP to PCM circuit mode conversion for the emergency call.

FIG. 4 also shows the interfaces between various entities. The call related interfaces between UE 110, P-CSCF 252, E-CSCF 254, MGCF 258 may be SIP. The call related interfaces between MGCF 258, S/R 292 and PSAP 180 may be MF/ISUP. The location related interface between PSAP 180 and E-SLP 272 may be an E2 interface defined in J-STD-036 rev. B if PSAP 180 is PSTN capable or an extension of the E2 interface if PSAP 180 is SIP capable. The location related interface between PSAP 180 and E-SLP 272 may instead be an MLP interface defined in OMA or LIF Mobile Location Protocol or some other interface, for example an HTTP interface. The location related interface between UE 110 and V-SLP 274 and E-SLP 272 may be SUPL ULP.

An interface between E-CSCF 254 and E-SLP 272 is used to convey information about UE 110 to E-SLP 272 and to instigate SUPL positioning. This interface may be an LCS IMS (e.g., Li) interface and may utilize an IMS Location Protocol (ILP) or some other protocol. The Li/ILP interface may be similar to an OMA Roaming Location Protocol (RLP) interface between SLPs. The Li/ILP interface may be used by any IMS entity (e.g., an S-CSCF or Application Server) and E-SLP 272 to support other features associated with IMS and IP-based services such as:

(a) Location dependent billing for VoIP or other IP-based calls, (b) Provision of the location of one party on a call to one or more other parties, and (c) Supplementary services based on user location, e.g., location dependent call forwarding, location dependent call barring.

The interface between E-SLP 272 and E-CSCF 254 may also be a v2 interface defined in "Draft NENA Standards for VoIP/Packet Migration i2 Solutions" or in "Interim VoIP Architecture for Enhanced 9-1-1 Services (i2)" (hereinafter, the "NENA 12 solution"), which is being considered for E911 VoIP support in the United States, or some other interface.

Network architecture 400 may include other entities to support VoIP and/or location, e.g., the elements described in the NENA I2 solution or draft NENA I2.5 and I3 solutions.

1.1. Call Setup

Figure 5:
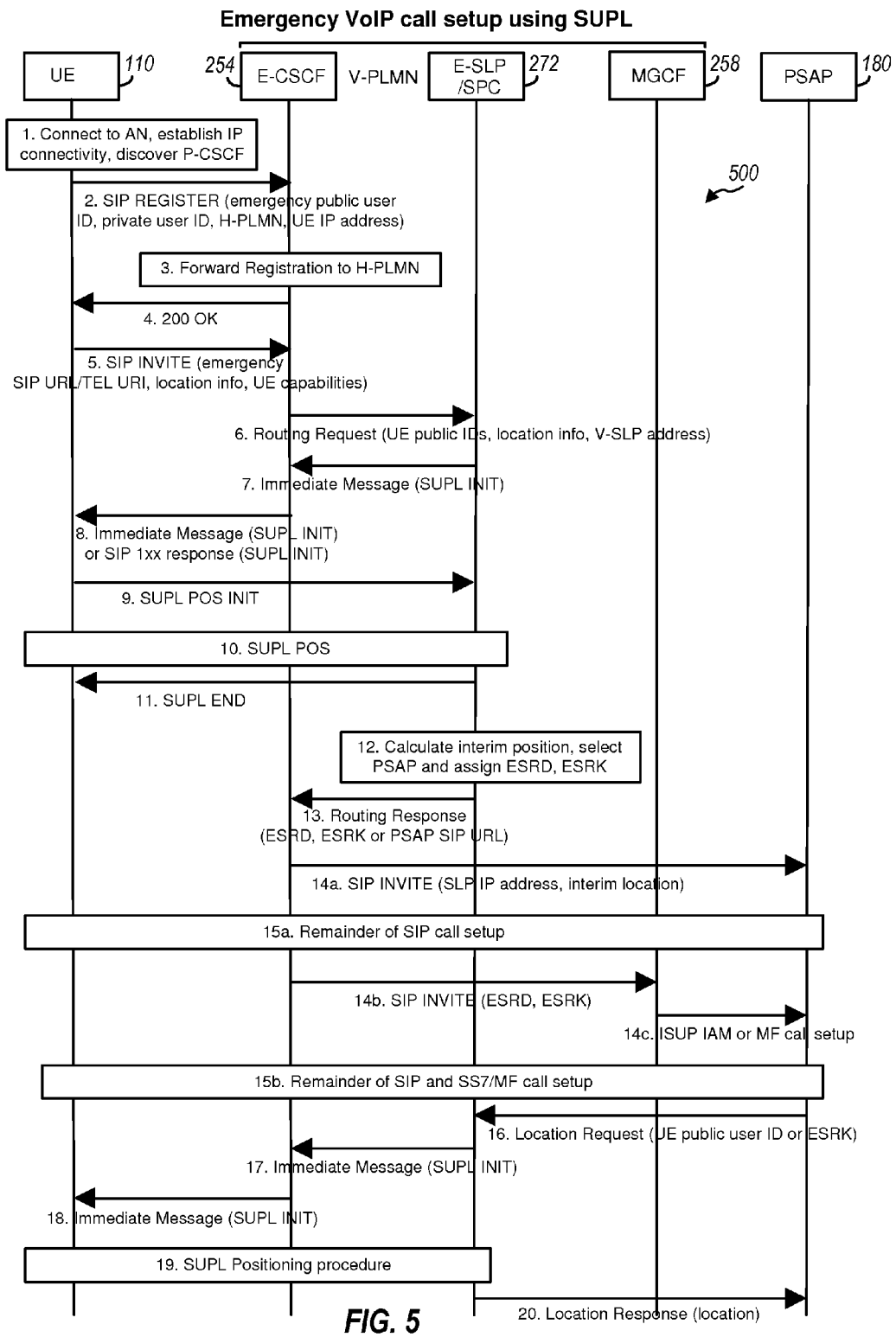

FIG. 5 shows an embodiment of a message flow 500 for emergency VoIP call setup using SUPL. For clarity, entities that are less relevant (e.g., access network 120, P-CSCF 252, S/R 292) are omitted from FIG. 5 but are included in the descriptions below. Message flow 500 may be used for 3GPP and 3GPP2 networks. Message flow 500 assumes that UE 110 has a UICC or UIM and that there is roaming agreement between H-PLMN 160 and V-PLMN 130.

In step 1, UE 110 discovers an access network (AN), e.g., a 3GPP access network, a 3GPP2 access network, an 802.11 WLAN, etc. UE 110 performs any low level connection (e.g., 802.11 association) and attaches to the access network (e.g., via GPRS attach or WLAN AAA procedure for 3GPP). UE 110 establishes IP connectivity and may discover a local SIP server address. In the description below, P-CSCF 252 is the local SIP server discovered by UE 110. Step 1 may be performed in different manners for different networks and is described in further detail below.

In step 2, UE 110 sends a SIP REGISTER to P-CSCF 252, which is the local SIP server discovered in step 1. The SIP REGISTER may include an emergency services indication, an emergency public user ID (e.g., as described in 3GPP TR 23.867 and in 3GPP TS 23.167), a private user ID, an H-PLMN domain name, and a UE IP address obtained in step 1. The SIP REGISTER may also include location information for UE 110, the location capabilities of UE 110, and/or other information. The UE location capabilities may comprise the location solutions supported by UE 110 (e.g., SUPL, 3GPP control plane, X.S0024, etc.), the positioning methods supported by UE 110, and/or other information. Due to the presence of the emergency services indication or the emergency public user ID, P-CSCF 252 forwards the SIP REGISTER to E-CSCF 254 in the same network, and not to I-CSCF 262 in H-PLMN 160 as in non-emergency cases.

In step 3, E-CSCF 254 in V-PLMN 130 forwards the SIP REGISTER to S-CSCF 264 in H-PLMN 160 where normal IMS registration occurs. The reasons for registering in H-PLMN 160 are (1) to authenticate the user identity, (2) to obtain a verified callback number from S-CSCF 264, (3) to alert H-PLMN 160 of the emergency call so that special treatment (e.g., priority, restriction of supplementary services) may be applied if PSAP 180 later calls back UE 110 via H-PLMN 160. For IMS registration, S-CSCF 264 in H-PLMN 160 treats E-CSCF 254 in V-PLMN 130 like a P-CSCF. A public user TEL URI (e.g., derived from a MSISDN in 3GPP or a MIN in 3GPP2) may be implicitly registered with the emergency public user ID for UE 110 and may be used for PSAP callback from a PSTN. H-PLMN 160 may not support the additional registration of the emergency public user ID, e.g., if UE 110 had already registered a normal public user ID or if the emergency public user ID is not supported by H-PLMN 160. E-CSCF 254 may maintain a list of H-PLMNs for which step 3 may be skipped. If step 3 is skipped, callback from PSAP 180 may still be possible using a normal public user ID of UE 110, which should be registered by UE 110 separately. E-CSCF 254 may also assign a temporary public user ID to UE 110, as described below, to enable callback from PSAP 180 directly via V-PLMN 130 and not via H-PLMN 160. This temporary public user ID may be especially useful for a foreign roaming UE since both delay and reliability of callback may be improved. If registration in H-PLMN 160 is not performed, then UE 110 is not authenticated and a secure IP connection between UE 110 and E-CSCF 254 in V-PLMN 130 may not be established, which may degrade security for subsequent location of UE 110 by E-SLP 272.

In step 4, E-CSCF 254 (e.g., after receiving a SIP 200 OK from H-PLMN 160) returns a 200 OK to UE 110. Following setup of the emergency call, if UE 110 is handed off within the same V-PLMN to a different SGSN (for GPRS access), a different WLAN (for WLAN access), or a different PCF or PDSN (for cdma2000 access), then UE 110 may re-register by repeating steps 2 through 4 in order to update location and V-SLP information. If UE 110 re-registers using its emergency public user ID, then E-CSCF 254 may transfer any new location information to E-SLP 272. The re-registration enables a different V-SLP to be chosen if UE 110 has moved out of the geographic area supported by the previous V-SLP.

For 3GPP2 WLAN access, a handoff procedure may be performed if UE 110 moves from one WLAN to another WLAN or from a WLAN to a cdma2000 network. The handoff procedure may establish a new tunnel to the previous PIDF from either the new WLAN (for handoff from one WLAN to another WLAN) or from the new PSDN (for handoff from a WLAN to a cdma2000 network) in order to continue using the IP address associated with the previous PDIF and to avoid disruption to the emergency VoIP call. For handoff from a cdma2000 network to a WLAN, the PDIF associated with the new WLAN may emulate a target PDSN to support fast handoff to the previous serving PDSN. Following the handoff, UE 110 may re-register to provide E-CSCF 254 with new location information relevant for V-SLP selection.

In an alternative embodiment of steps 2, 3 and 4, after UE 110 sends a SIP REGISTER to P-CSCF 252 in step 2, P-CSCF 252 may forward the SIP REGISTER directly to S-CSCF 264 in H-PLMN 160 or to I-CSCF 262 in H-PLMN 160 and bypass E-CSCF 254 in V-PLMN 130. In this case, a SIP 200 OK from H-PLMN 160 would be returned to P-CSCF 252 rather than to E-CSCF 254, and P-CSCF 252 would return the 200 OK to UE 110 in step 4. This alternative embodiment may reduce or avoid special impacts to P-CSCF 252 to support VoIP emergency calls because P-CSCF 252 actions are then like those for normal registration.

In step 5, UE 110 sends a SIP INVITE to P-CSCF 252. The SIP INVITE may include a global SIP URL or TEL URI indicating an emergency call (e.g., sos@local-domain or "911" proposed by IETF Ecrit) and the type of emergency service requested. The SIP INVITE may also include information concerning UE location that is available to UE 110 (e.g., a GPRS or cdma2000 cell ID, a WLAN AP MAC address, etc.), location capabilities of UE 110 if not provided during registration, contact information for callback, and/or other information. The callback information may include a TEL URI (e.g., derived from the 3GPP MSISDN or 3GPP2 MDN) and possibly a SIP URL (e.g., the emergency public user ID used in step 2). A "supported" header field of the SIP REGISTER or SIP INVITE may also be used to convey the UE location capabilities. The location capabilities may also be included as part of location information provided by the UE (for example in the IETF Geopriv pidf-lo object) or in some other manner in the SIP INVITE. P-CSCF 252 may forward the SIP INVITE to another SIP server, which may forward the SIP INVITE to a routing proxy (e.g., an Application Server) dedicated to emergency calls. In FIG. 5, E-CSCF 254 is the SIP server that handles emergency calls.

In step 6, E-CSCF 254 may determine either explicitly or implicitly that UE 110 supports SUPL and sends a Routing Request (or an Emergency Location Request) to E-SLP 272. The Routing Request may include the UE public identities (e.g., the emergency public user ID from step 5, the TEL URI, etc.), any location information received by E-CSCF 254, and the UE IP address if mobile terminated IP (or UDP/IP) will be used in step 8. E-SLP 272 may be in the same network as E-CSCF 254 or in some other network. E-SLP 272 may be selected because it covers a geographic area that includes an approximate location of UE 110. E-CSCF 254 may select E-SLP 272, a generic location server capable of acting as an E-SLP, or some other types of server, e.g., GMLC 276. The selected location server may elect to use SUPL based on the UE location capabilities transferred by E-CSCF 254 (or simply by assumption). E-CSCF 254 may request location information from E-SLP 272 and/or selection of a PSAP corresponding to the available location information and type of emergency service.

E-SLP 272 proceeds to step 12 if the location information provided in step 6 enables E-SLP 272 to derive a position estimate for UE 110 that is accurate enough to fulfill the request in step 6 (e.g., determine a destination PSAP uniquely). Otherwise, steps 7 through 11 are performed to obtain a suitable position estimate for UE 110.

In step 7, E-SLP 272 determines from the received location information whether to use a separate V-SLP to assist with location. If so, then a V-SLP (e.g., V-SLP 274) may be selected based on the location information received from E-CSCF 254. E-SLP 272 acts as an H-SLP in performing subsequent SUPL location using procedures that may be similar to those used for (a) SUPL 1.0 roaming support if a V-SLP was selected or (b) SUPL 1.0 non-roaming support if a V-SLP was not selected. In the roaming case, E-SLP 272 may exchange some preliminary RLP signaling with V-SLC 422, which is not shown in FIG. 5. E-SLP 272 then generates a SUPL INIT to instigate a network initiated location procedure with UE 110 using either proxy or non-proxy modes in SUPL. E-SLP 272 may send the SUPL INIT directly to UE 110 using mobile terminated IP or UDP/IP, in which case step 8 may be skipped. E-SLP 272 may also send the SUPL INIT inside an Immediate message (e.g., an IMS Immediate Message or some other IMS or SIP message) to E-CSCF 254. In either case, the SUPL INIT may include an IP address of an SPC used for positioning (which may be E-SPC 414 or V-SPC 424 if non-proxy mode is used), quality of position (QoP) accuracy/delay requirements for a fast interim position estimate, a proxy/non-proxy mode indication, authentication data and/or other information. The SUPL INIT may also include an IP address of E-SLP 272, e.g., if UE 110 is not in its home network, if E-SLP 272 is not the H-SLP for UE 110, or if E-SLP 272 is the H-SLP but chooses not to behave as the H-SLP (e.g., to avoid supporting more than one procedure for emergency calls). The SUPL INIT may also include an emergency call indication, e.g., in a SUPL INIT notification parameter.

In step 8, E-CSCF 254 forwards the SUPL INIT to UE 110 via P-CSCF 252 using an IMS Immediate message, some other IMS message, a SIP 1xx response (e.g., a 183 Session Progress), or some other IP-based message that uses secure IP associations between E-CSCF 254, P-CSCF 252 and UE 110 established in steps 2 through 4.

In step 9, UE 110 establishes a secure IP (e.g., secure TCP/IP) connection to E-SLP 272, which may be the H-SLP for UE 110 or may have included its address in the SUPL INIT sent in step 7. For non-proxy mode, UE 110 obtains authentication data from E-SLP 272 (not shown) and establishes a secure IP connection to E-SPC 414 or V-SPC 424 with mutual authentication. E-SLC 412 also conveys information to E-SPC 414 or V-SPC 424 for non-proxy mode (not shown in FIG. 5). UE 110 may obtain location related measurements (e.g., signal levels and/or timing of neighboring cells) or a position estimate (e.g., using standalone GPS) consistent with the received QoP. UE 110 then returns a SUPL POS INIT to either E-SLP 272 (for proxy mode) or E-SPC 414 or V-SPC 424 (for non-proxy mode, which is not shown in FIG. 5). The SUPL POS INIT may include a hash code used for authentication in proxy mode, the UE positioning capabilities, a position estimate or a request for A-GPS assistance data (which may also be included in an embedded SUPL POS message for IS-801). The SUPL POS INIT may also include location related measurements to assist derivation of a fast interim position estimate and avoid further SUPL POS signaling. For 3GPP, the measurements may comprise signal levels of neighboring base stations or access points, GPRS timing advance, WCDMA Rx-Tx time difference, etc. For 3GPP2, the measurements may comprise location related measurements relevant to cdma2000 or 3GPP2 WLAN.

In step 10, E-SLP 272, E-SPC 414 or V-SPC 424 may exchange additional SUPL POS messages with UE 110 if a suitable position estimate (or location measurements) was not received in step 9. Each SUPL POS message may include an embedded RRLP, RRC or IS-801 positioning message. This message exchange continues until adequate positioning measurements or a position estimate have been provided to E-SLP 272, E-SPC 414 or V-SPC 424. In step 11, a SUPL END is returned to UE 110 to close the SUPL transaction.

In step 12, E-SLP 272, E-SPC 414 or V-SPC 424 computes an interim position estimate for UE 110 from the location information received in step 9 or step 10. For non-proxy mode, E-SPC 414 or V-SPC 424 conveys the position estimate to E-SLC 412. Based on the position estimate, and if requested by E-CSCF 254 in step 6, E-SLP 272 selects a PSAP. The following description assumes that PSAP 180 is the selected PSAP. If PSAP 180 is PSTN accessible/capable, then E-SLP 272 obtains (a) an Emergency Services Routing Digit (ESRD) non-dialable directory number that may be used to route to PSAP 180 and (b) an Emergency Services Routing Key (ESRK) non-dialable directory number that identifies PSAP 180, E-SLP 272 and, temporarily, UE 110. Each PSAP may be associated with one ESRD as well as a pool of ESRKs that identifying E-SLP 272 and that PSAP. For each emergency call by a UE to this PSAP, one ESRK from the pool may be assigned to the UE for the duration of the emergency call. Some of these functions (e.g., ESRD/ESRK management) may not be considered as part of SUPL and may be supported in a separate physical or logical entity that may be queried by E-SLP 272 (e.g., as described in the NENA I2 solution). The ESRD and ESRK correspond to the same named directory numbers used for emergency call support in circuit mode (e.g., J-STD-036). The ESRD and ESRK also correspond to the ESRN and ESQK, respectively, described in the NENA I2 solution.

In step 13, E-SLP 272 returns to E-CSCF 254 a Routing Response (or an Emergency Location Response) that may include (a) the PSAP identity (which may be either a SIP URL or an IP address) if PSAP 180 is IP capable or (b) the ESRD and ESRK if PSAP 180 is PSTN capable. The Routing Response may also include the interim position estimate for UE 110 if requested by E-CSCF 254. E-SLP 272 may store for UE 110 a call record containing all information collected for the UE.

Steps 14a and 15a are performed if PSAP 180 is IP capable. In step 14a, E-CSCF 254 routes the SIP INVITE (received in step 5) to PSAP 180. The SIP INVITE may include an interim position estimate and possibly the identity or address for UE 110 and the IP address or name of E-SLP 272. In step 15a, additional SIP signaling may be exchanged to establish the emergency call.

Steps 14b, 14c and 15b are performed if PSAP 180 is PSTN capable. In step 14b, E-CSCF 254 forwards the SIP INVITE via a Breakout Gateway Control Function (BGCF) to MGCF 258. The SIP INVITE may include the call back number (e.g., MSISDN or MDN) for UE 110 and/or may include the ESRD and ESRK (but possibly not an interim position estimate). In step 14c, MGCF 258 routes the emergency call to PSAP 180 via the PSTN, possible via a selective router, using SS7 ISUP and/or MF signaling. The ESRD or ESRK may be used as routing numbers and the ESRK and/or call back number are passed to PSAP 180 (e.g., via MF CAMA signaling) as the identity of UE 110 and as a key to obtain more information. In step 15b, additional SIP signaling may be exchanged and interworking with SS7 ISUP and/or MF at MGCF 258 may occur to establish the emergency call.

The call path for a IP capable PSAP and a PSTN capable PSAP is established separately. For a PSTN capable PSAP, interworking between VoIP (e.g., RTP/IP) and circuit mode (e.g., PCM) occurs at a Media Gateway (MGW) controlled by MGCF 258. For an IP capable PSAP, the call path would be end-to-end IP and would go between UE 110 and PSAP 180, possibly partly via the public Internet or a private IP network, but would skip any MGW.

In step 16, after the call is established, PSAP 180 may send a Location Request to E-SLP 272, which may be identified by an IP address or name obtained in step 14a or an ESRK obtained in step 14c. PSAP 180 identifies UE 110 using the UE public user address (if PSAP 180 is IP capable) or a call back number or other address (e.g., MSISDN or MDN) or the ESRK (if PSAP 180 is PSTN capable). The Location Request indicates a requirement for an accurate position estimate. For an emergency VoIP call in the United States, the Location Request may be identical to an Emergency Services Position Request in J-STD-036 if PSAP 180 is PSTN capable and may be an extension to this message if PSAP 180 is IP capable. For an emergency VoIP call in some other world regions, the Location Request may be identical to an Emergency Location Immediate Request defined for OMA MLP.

In step 17, E-SLP 272 may select a V-SLP if the location capabilities of E-SLP 272 do not extend to the geographic area where the last known position of UE 110 was reported or if using a V-SLP may provide more accurate and reliable location. E-SLP 272 may derive a V-SLP address from the most recent position of UE 110 and/or from the most recent V-SLP address provided by E-CSCF 254. In order to ensure the correct V-SLP, E-SLP 272 may query the location of UE 110 and/or the V-SLP address from E-CSCF 254 (not shown in FIG. 5) if E-CSCF 254 does not automatically transfer this information following any re-registration of UE 110 in step 4. E-SLP 272 may then open a new SUPL transaction with UE 110 by sending a SUPL INIT directly to the UE using mobile terminated IP or UDP/IP (in which case step 18 may be skipped) or by sending an Immediate message containing the SUPL INIT to E-CSCF 254. The SUPL INIT may include the parameters described above for step 7.

In step 18, E-CSCF 254 transfers to UE 110 the SUPL INIT inside an IMS Immediate message, some other IMS message, a SIP message (e.g., a re-INVITE), or some other IP-based message that uses the secure IP associations between E-CSCF 254, P-CSCF 252 and UE 110.

In step 19, UE 110 establishes a secure IP connection to E-SLP 272. UE 110 may then exchange SUPL messages with E-SLP 272 for proxy mode or with E-SPC 414 or V-SPC 424 for non-proxy mode (similar to steps 9, 10 and 11) to obtain an accurate position estimate for the UE.

In step 20, E-SLP 272 sends the accurate position estimate for UE 110 in a Location Response to PSAP 180. For an emergency call in the US, the Location Response may be identical to an Emergency Services Position Response message in J-STD-036 for the E2 interface if PSAP 180 is PSTN capable (and may thus include additional information such as the MSISDN of UE 110). For an emergency call in some other world regions, the Location Response may be identical to an Emergency Location Immediate Answer defined for OMA MLP.

UE 110 may thereafter communicate with PSAP 180 for the emergency VoIP call. When the call is later released, E-CSCF 254 may send an indication to E-SLP 272, which may then release any record of the call. E-CSCF 254 or UE 110 may also de-register the emergency public user ID, which was registered in steps 2 through 4. Alternatively, E-CSCF 254, E-SLP 272 and UE 110 may allow the registration and call records to persist for some period of time to support possible later callback from PSAP 180 to UE 110 and/or additional location requests.

1.2. Access

For step 1, UE 110 may connect to an access network via GPRS access, cdma2000 access, or WLAN access. Step 1 may be performed in different manners for different types of access.

For GPRS access, UE 110 may perform GPRS attach to attach to a 3GPP access network and may perform GPRS Packet Data Protocol (PDP) context activation to establish IP connectivity in SGSN 232a and GGSN 232b, as described in 3GPP TR 23.867 and TS 23.060. An emergency indication may be used in the GPRS attach and/or a global Access Point Name (APN) for emergency services may be used for PDP context activation, which may ensure provision of a GGSN and a P-CSCF in V-PLMN 130. P-CSCF 252 may be a P-CSCF in a serving GPRS PLMN as provided during PDP context activation.

For 3GPP WLAN access, UE 110 may perform a WLAN AAA procedure to attach to a WLAN and may perform I-WLAN tunnel establishment for IP connectivity to PDG 236. UE 110 may select service from V-PLMN 130 by using a roaming Network Access Identifier (NAI) that indicates both H-PLMN 160 and V-PLMN 130 in the request for authentication and authorization. The roaming NAI is described in 3GPP TS 23.234 and TS 23.003. This ensures that UE 110 can obtain IP access to IMS services from PDG 236 in V-PLMN 130 rather than from a PDG in H-PLMN 160 (which may restrict PSAP access if H-PLMN 160 is remote). A global WLAN APN (W-APN) for emergency services may be used for PDG discovery and tunnel establishment. This service may use a global unique external network identifier (for support of emergency services) and the V-PLMN identity. P-CSCF 252 may be a P-CSCF in a V-PLMN associated with a WLAN and may be discovered via a DNS query on the W-APN.

For cdma2000 access, UE 110 obtains a simple IP address rather than a mobile IP address since service is obtained from V-PLMN 130 and not H-PLMN 160. Alternatively, UE 110 may obtain a mobile IP address from V-PLMN 130 rather than from H-PLMN 160 as is more normal for a mobile IP address. An IP address may be an IPv4 address or an IPv6 address. If UE 110 has not established connectivity (e.g., has no assigned IP address), then UE 110 may establish a Point-to-Point Protocol (PPP) session and perform any authentication and authorization with PDSN 242 in V-PLMN 130, as described in 3GPP2 X.P0011D and TIA-835-D. UE 110 may obtain a simple IP address, e.g., using the PPP Internet Protocol Control Protocol (IPCP). If UE 110 has already established IP connectivity and has a PPP session to PDSN 242 but is assigned mobile IP address(es) in H-PLMN 160 instead of simple IP address(es), then UE 110 may terminate any packet sessions associated with these IP addresses as well as any IMS registration if UE 110 cannot support simultaneous simple IP and mobile IP addresses, which is an optional but not mandatory UE capability in TIA-835D. UE 110 may then obtain a simple IP address as described in TIA-835D. If UE 110 can support simultaneous simple and mobile IP addresses, then UE 110 may just obtain a simple IP address if it does not already have one.

For cdma2000 access, UE 110 may discover a P-CSCF address in V-PLMN 130 by (a) using DHCP or IPCP to obtain a P-CSCF domain name and a DNS address from a DHCP server or PDSN 242 and then (b) using DNS to obtain one or more P-CSCF IP addresses from the DNS server. If UE 110 moves and accesses a new RAN, then V-PLMN 130 and UE 110 may employ a fast handoff procedure described in TIA-835-D if a new target PDSN is needed and an emergency VoIP call is already established. This avoids the need to terminate and re-establish the call.

For 3GPP2 WLAN access, UE 110 may perform existing WLAN access procedure including AAA, IP address acquisition, and discovery of a default IP router and DNS server address (e.g., via DHCP). UE 110 may then access a PDIF in a PLMN that supports emergency calls from the geographic location of the WLAN accessed by UE 110. The WLAN may advertise associated cdma2000 networks such that emergency call supporting PLMNs can be distinguished. This advertisement may be achieved, e.g., by sending associated Service Set Identifiers (SSIDs) in IEEE 802.11 beacon frames or via responses to UE probe request frames. The PLMNs may be prioritized by the order in which they are advertised, by use of an indicator for each advertised PLMN, or by ensuring (e.g., requiring) that all advertised PLMNs support emergency calls. For the initial WLAN access, AAA, and IP address acquisition, UE 110 may choose a PLMN (e.g., a SSID) that is implied or indicated to support emergency calls.

Following initial WLAN access, AAA, IP address acquisition, and discovery of a default router and DNS server address, UE 110 may create a fully qualified domain name (FQDN) that indicates IMS service and uses a domain associated with one of the PLMNs advertised by the WLAN that support emergency calls. UE 110 may then use the FQDN to discover the IP address(es) of one or more PDIFs from the DNS server. UE may choose a PDIF and establishes an IPsec tunnel to it using the procedures described in 3GPP2 X.S0028-200. This provides UE 110 with a second inner IP address, which may be used for subsequent IMS related procedures.

Following tunnel establishment to a PDIF from a WLAN, UE 110 may discover a P-CSCF address in the same way as an UE accessing a PDSN from a cdma2000 access network (e.g., via DHCP to obtain a DNS server address and a domain name and then via DNS to obtain the P-CSCF IP address). In this case, the PDIF may act as a DHCP relay agent instead of the PDSN. Discovery of the PIDF and P-CSCF addresses via DNS may include an indication (e.g., in the name provided to the DNS server) that support of emergency call is needed.

If UE 110 already has an association (e.g., a tunnel) to a PDIF in an unsuitable PLMN and if UE 110 does not support tunnels to different PDIFs simultaneously, then UE 110 may release any packet sessions supported via the current PDIF and release the tunnel to the PDIF before selecting and establishing a tunnel to a new PDIF in a new suitable PLMN.

Following either cdma2000 or WLAN access network connection, UE 110 may discover a SUPL V-SLP address using a DNS query with a known V-PLMN domain name and V-SLP identification (e.g., supl_vslp@domain_name).

Message flow 500 has the following feature additions related to OMA SUPL version 1.0.
  (a) Addition of an E-SLP address in a SUPL INIT, which overrides and replaces an H-SLP address configured in UE 110.
  (b) Interface between the IMS side (e.g., E-CSCF 254) and the location side (e.g., E-SLP 272).
  (c) Use of V-SLP 274 and discovery of the V-SLP address.
  (d) Conveyance of a SUPL INIT using mobile terminated IP, UDP/IP, SIP or IMS signaling, instead of SMS or WAP Push, to reduce delay.
  (e) Addition of an emergency services indication in the SUPL INIT.
  (f) Preference for addition of new location measurements in a SUPL POS INIT.
  (g) Use of ILP protocol between E-CSCF 254 and E-SLP 272, which may be similar to the existing RLP.
  (h) Security.

2. Emergency VoIP Call with 3GPP Control Plane

Figure 6:
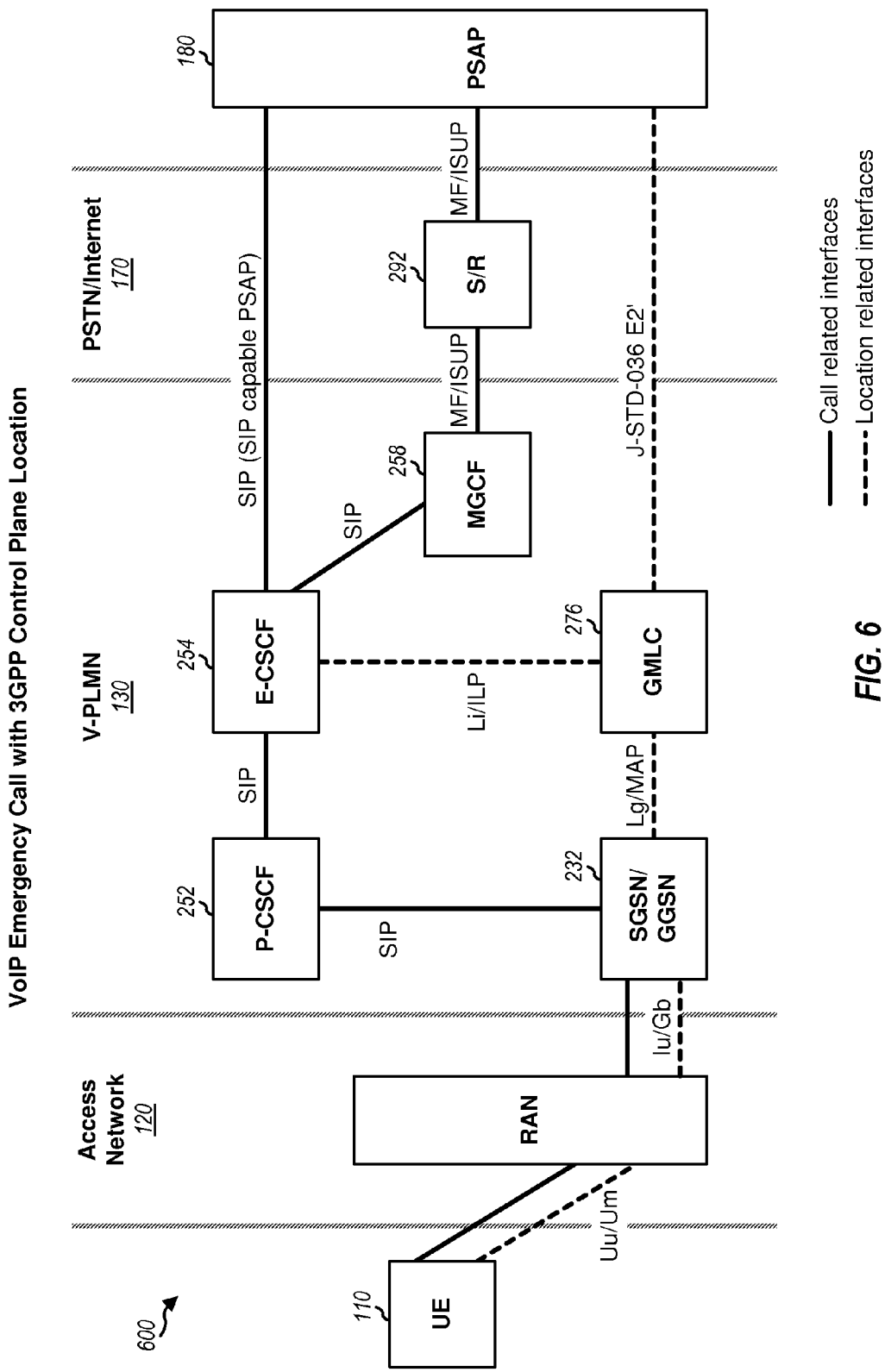
FIGS. 6 and 7 show a network architecture and a message flow, respectively, for emergency VoIP call with 3GPP control plane location.

FIG. 6 shows a block diagram of an embodiment of a network architecture 600 applicable for 3GPP control plane location. For simplicity, FIG. 6 only shows entities and interfaces relevant to support of emergency VoIP calls with GPRS access and 3GPP control plane location.

Access network 120 may be a GERAN or a UTRAN. V-PLMN 130 may include P-CSCF 252, E-CSCF 254 and MGCF 258 to support IMS (e.g., VoIP), SGSN/GGSN 232 for packet switched services, and GMLC 276 for location services. GMLC 276 replaces E-SLP 272 and is an enhanced version of the GMLC described in 3GPP 23.271, Release 6. V-PLMN 130 may also include E-SLP 272 and V-SLP 274 for location services (not shown in FIG. 6).

In an embodiment, GMLC 276 communicates with E-CSCF 254 via the Li interface and communicates with PSAP 180 via the J-STD-036 E2' interface. The use of the same Li interface for GMLC 276 and E-SLP 272 may hide location architecture differences between SUPL and 3GPP control plane from E-CSCF 254. Similarly, the use of the same J-STD-036 E2' interface for GMLC 276 and E-SLP 272 may hide location architecture differences from PSAP 180. The other interfaces in FIG. 6 are known in the art.

2.1. Call Setup

Figure 7:
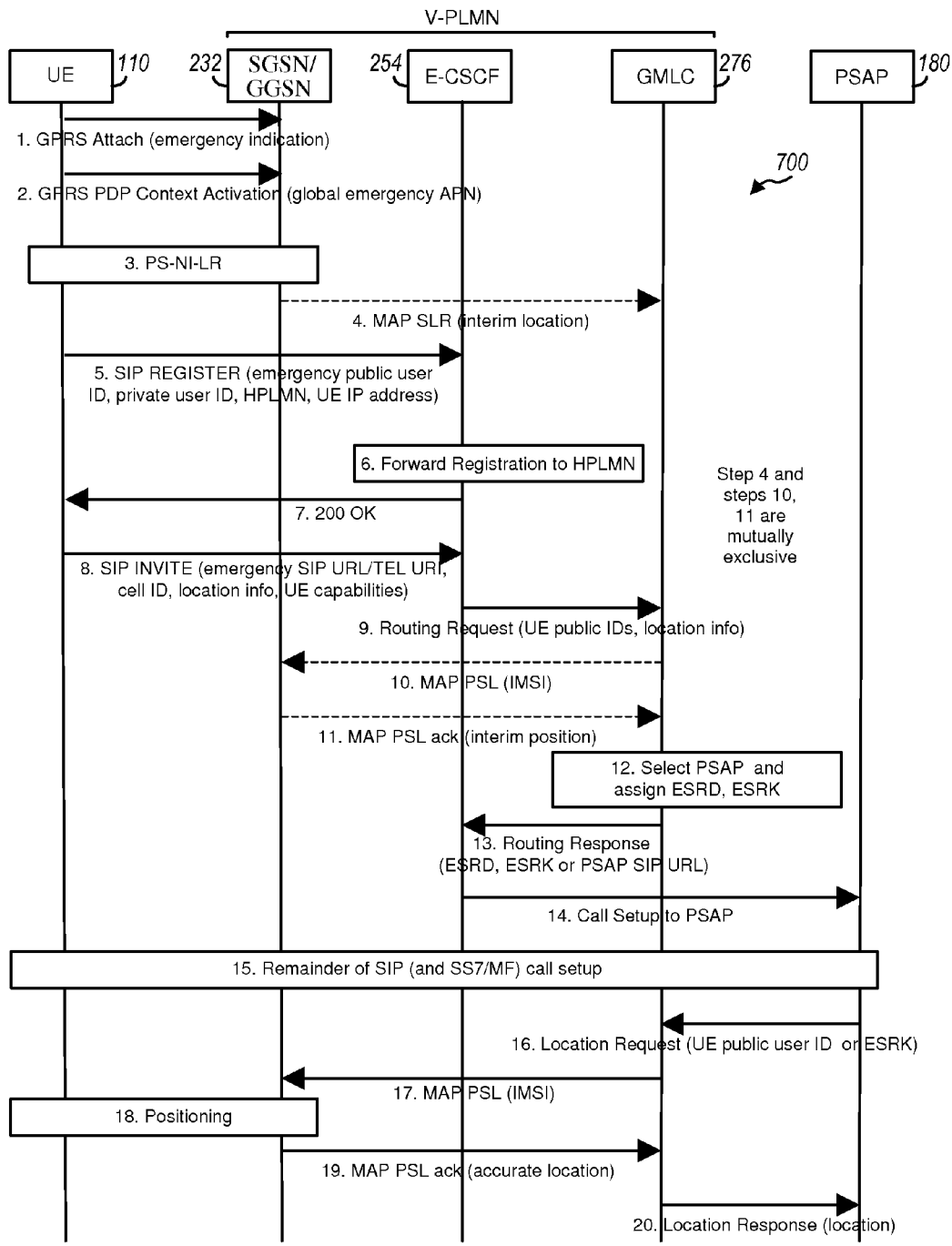

FIG. 7 shows an embodiment of a message flow 700 for emergency VoIP call setup using 3GPP control plane. For clarity, entities that are less relevant (e.g., access network 120, P-CSCF 252, S/R 292) are omitted from FIG. 7 but are included in the descriptions below. Message flow 700 assumes that UE 110 has a UICC and that there is roaming agreement between H-PLMN 160 and V-PLMN 130.

In step 1, UE 110 performs GPRS attach with an emergency services indication, if the UE is not yet GPRS attached. GPRS attach may entail obtaining access to SGSN 232a, performing any authentication and downloading of subscription data from HLR/HSS 266 in H-PLMN 160 to SGSN 232a, and so on. In step 2, UE 110 performs PDP context activation using the global APN for emergency services. The PDP context is assigned to a local GGSN in V-PLMN 130 (e.g., and not to a GGSN in H-PLMN 160). UE 110 obtains an IP address and may discover a local SIP server address (e.g., P-CSCF 252) during PDP context activation.

In step 3, SGSN 232 becomes aware of the initiation of an emergency call based on the emergency indication in step 1 or the global APN for emergency services in step 2. SGSN 232a may then initiate a Packet Switched Network Induced Location Request (PS-NI-LR) described in 3GPP TS 23.271 to obtain either an interim position estimate or a more accurate position estimate for UE 110. The PS-NI-LR provides a faster response than if SGSN 232 waits for a request to obtain the position estimate (e.g., via a MAP PSL in step 17) from GMLC 276. The PS-NI-LR may be performed by an initial SGSN. If UE 110 is handed over to a new SGSN, then the new SGSN does not need to perform another PS-NI-LR. In step 4, once a position estimate for UE 110 is obtained, SGSN 232 may determine a GMLC address (e.g., from the current cell ID) and may send to GMLC 276 a MAP Subscriber Location Report (SLR) containing the position estimate, the UE identity, and/or other information. The UE identity may be an International Mobile Subscriber Identity (IMSI), a Mobile Subscriber ISDN number (MSISDN), an International Mobile Equipment Identity (IMEI), an Electronic Serial Number (ESN), a Mobile Equipment Identifier (MEID), or some other identity. If step 4 is performed, then steps 10 and 11 may be skipped.

In step 5, UE 110 sends a SIP REGISTER to P-CSCF 252, which was discovered in step 2. The SIP REGISTER may include the information described above for step 2 in FIG. 5 and may also include the SGSN address if steps 10 and 11 are to be performed. Due to the presence of the emergency services indication or the emergency public user ID, P-CSCF 252 forwards the SIP REGISTER to E-CSCF 254 in the same network. Step 5 may be performed in parallel with step 3. In step 6, E-CSCF 254 forwards the SIP REGISTER to H-PLMN 160 where normal IMS registration occurs, similar to step 3 in FIG. 5.

In step 7, after H-PLMN 160 returns a 200 OK to E-CSCF 254, a 200 OK is returned to UE 110. UE 110 may also re-register if there is a handoff to a different SGSN within V-PLMN 130. If UE 110 re-registers using its emergency public user ID, E-CSCF 254 may transfer any new location information and/or any new SGSN address to GMLC 276.

As in FIG. 5, in an alternative embodiment of steps 5, 6 and 7, after UE 110 sends a SIP REGISTER to P-CSCF 252 in step 5, P-CSCF 252 may forward the SIP REGISTER directly to S-CSCF 264 or I-CSCF 262 in H-PLMN 160 and bypass E-CSCF 254 in V-PLMN 130. In this case, a SIP 200 OK from H-PLMN 160 would be returned to P-CSCF 252 rather than to E-CSCF 254, and P-CSCF 252 would return the 200 OK to UE 110 in step 7. This alternative embodiment may reduce or avoid special impacts to P-CSCF 252 to support VoIP emergency calls because P-CSCF 252 actions are then like those for normal registration.

In step 8, UE 110 sends to P-CSCF 252 a SIP INVITE that may include the information described above for step 5 in FIG. 5. P-CSCF 252 forwards the SIP INVITE to E-CSCF 254.

In step 9, based on UE support of 3GPP control plane for packet mode, E-CSCF 254 sends a Routing Request to GMLC 276 indicated by the serving cell or other location information received in step 8. The Routing Request may include the information described in step 6 of FIG. 5 as well as the SGSN address if provided during registration. E-CSCF 254 may select GMLC 276, a generic location server capable of acting as a GMLC, or some other types of server (e.g., an SLP). The selected location server may elect to use 3GPP control plane based on the UE location capabilities transferred by E-CSCF 254. E-CSCF 254 may request location information from GMLC 276 and/or selection of a PSAP corresponding to the available location information and the type of emergency service being requested.

GMLC 276 proceeds to step 12 if the location information provided in step 9 enables GMLC 276 to derive a position estimate for UE 110 that is accurate enough to fulfill the request in step 9. GMLC 276 may also wait until it receives the MAP SLR from SGSN 232 in step 4 and, if a suitable position estimate is obtained, proceed to step 12. Otherwise, steps 10 and 11 are performed to obtain a suitable position estimate for UE 110.

In step 10, GMLC 276 sends to SGSN 232 a MAP Provide Subscriber Location (PSL) containing QoP accuracy/delay for a fast interim position estimate. If step 4 is not performed, then GMLC 276 may determine SGSN 232 from any explicit address or location information (e.g., cell ID) received in step 9. If no such information was received or if the SGSN initially chosen is incorrect (error response received in step 11), then GMLC 276 may query an HSS indicated by the UE's IMSI or pseudo IMSI or MSISDN to obtain the SGSN address. In step 11, SGSN 232 may return a position estimate obtained in step 3, wait until step 3 is completed and then return the position estimate, or obtain a position estimate from the RAN and then return the position estimate to GMLC 276.

In step 12, GMLC 276 selects a PSAP based on the position estimate. The following description assumes that PSAP 180 is the selected PSAP. If PSAP 180 is PSTN capable, then GMLC 276 obtains an ESRD non-dialable directory number that may be used to route to PSAP 180 and an ESRK non-dialable directory number that identifies PSAP 180, GMLC 276 and, temporarily, UE 110.

In step 13, GMLC 276 returns to E-CSCF 254 a Routing Response that may include the information described above for step 13 in FIG. 5. In step 14, the emergency call is sent to PSAP 180, as described for steps 14*a*, 14*b* and 14*c* in FIG. 5. In step 15, the remainder of the emergency call setup proceeds as described for steps 15*a* and 15*b* in FIG. 5. In step 16, PSAP 180 sends a location request to GMLC 276, which is indicated in step 14 by either an IP address/name or an ESRK, as described for step 16 in FIG. 5.

In step 17, GMLC 276 sends a MAP PSL to SGSN 232 requesting an accurate location. GMLC 276 may obtain the SGSN address from the most recent location information for UE 110 or from an update of the SGSN address from E-CSCF 254. GMLC 276 may also query the SGSN address from E-CSCF 254 if this address is received in re-REGISTER messages but not transferred. GMLC 276 may also query the SGSN address from the HSS indicated by the UE's IMSI or pseudo IMSI or MSISDN. In step 18, SGSN 232 instigates positioning of UE 110 by the RAN. In step 19, SGSN 232 returns the position estimate to GMLC 276. In step 20, GMLC 276 returns the position estimate to PSAP 180, as described for step 20 in FIG. 5.

UE 110 may thereafter communicate with PSAP 180 for the emergency VoIP call. When the call is later released, E-CSCF 254 may send an indication to GMLC 276, which may then release any record of the call. E-CSCF 254 or UE 110 may also de-register the emergency public user ID, which is registered in steps 5 through 7. Alternatively, E-CSCF 254, GMLC 276 and UE 110 may allow the registration and call records to persist for some period of time to support possible later callback from PSAP 180 to UE 110 and/or additional location requests.

Message flow 700 performs call setup and location for UE 110 in a coordinated manner and has the following features.
  (a) SGSN 232 can obtain the UE location and push it to GMLC 276 whenever PDP context is activated and/or if requested by GMLC 276.
  (b) GMLC 276 can receive a public SIP-URI address for UE 110 from E-CSCF 254.
  (c) If PSAP 180 is PSTN capable, GMLC 276 and E-CSCF 254 can transfer to PSAP 180 information (e.g., a 10-digit ESRK) used to identify both the call and GMLC 276. This information enables PSAP 180 to pull location and other information (e.g., MSISDN, SIP URI) from GMLC 276.
  (d) The Li interface between E-CSCF 254 and a location server (e.g., E-SLP 272) may be used to support emergency calls from an I-WLAN when SUPL is used as the position method. The use of the same Li interface for UMTS, GPRS and I-WLAN allows IMS (e.g., E-CSCF 254) to operate without having to be aware of the location solution, which may simplify IMS handling.
  (e) If UE 110 does not support location by the RAN (e.g., supports SUPL but not 3GPP control plane) then SGSN 232 may skip the PS-NI-LR.
  (f) PSAP 180 may have specific location requirements that may not be known to SGSN 232, e.g., particular accuracy or even no support for location coordinates (e.g., if PSAP 180 supports E911 phase 0 or 1). Such requirements are supported in GMLC 276 for circuit-switched emergency calls.

The Li interface may be used to achieve the features listed above. Support of the Li interface externally may not be needed if the GMLC and E-CSCF functions are supported by the same platform. The Li interface may be extended to usage between any IMS entity and the GMLC to support other features associated with IMS and IP-based services, as described above for SUPL.

SGSN 232 may be selected based on an interim position estimate (e.g., serving cell) for UE 110. GMLC 276 may be selected by E-CSCF 254 based on the same interim position estimate. The interim position estimate may be pushed from SGSN 232 to GMLC 276 or pulled by GMLC 276 from SGSN 232. One entity may determine the other entity as follows.

SGSN 232 may push the interim position estimate to GMLC 276. SGSN 232 may obtain this interim position estimate via the PS-NI-LR, determine a GMLC address according to the current UE location (e.g., current cell ID), and send/push the position estimate to GMLC 276 using a MAP Subscriber Location Report (SLR). E-CSCF 254 may query GMLC 276 for a PSAP address in order to route the emergency call. GMLC 276 may wait (if needed) for the MAP SLR from SGSN 232 in order to determine the PSAP address from the interim position estimate.

GMLC 276 may pull the interim position estimate from SGSN 232. SGSN 232 may still perform the PS-NI-LR but would not send the position estimate to GMLC 276 until the GMLC queries for the position estimate via a MAP PSL request. GMLC 276 may determine the SGSN address using one of the following.
  (a) GMLC 276 queries the SGSN address from either HSS 266 in H-PLMN 160 (if UE 180 has UICC and roaming supported in V-PLMN 130) or HSS 250 in V-PLMN 130 (if UE 180 has no UICC or no roaming agreement in V-PLMN 130).
  (b) UE 110 includes the current SGSN address or location information (e.g., a GPRS cell ID) from which the SGSN address may be derived in each REGISTER and re-REGISTER message sent to IMS or in each SIP INVITE message sent to IMS for an emergency call. E-CSCF 254 then transfers the SGSN address or location information to GMLC 276. UE 110 re-registers in IMS following any inter-SGSN handover.

3. Emergency VoIP Call with X.S0024

Figure 8:
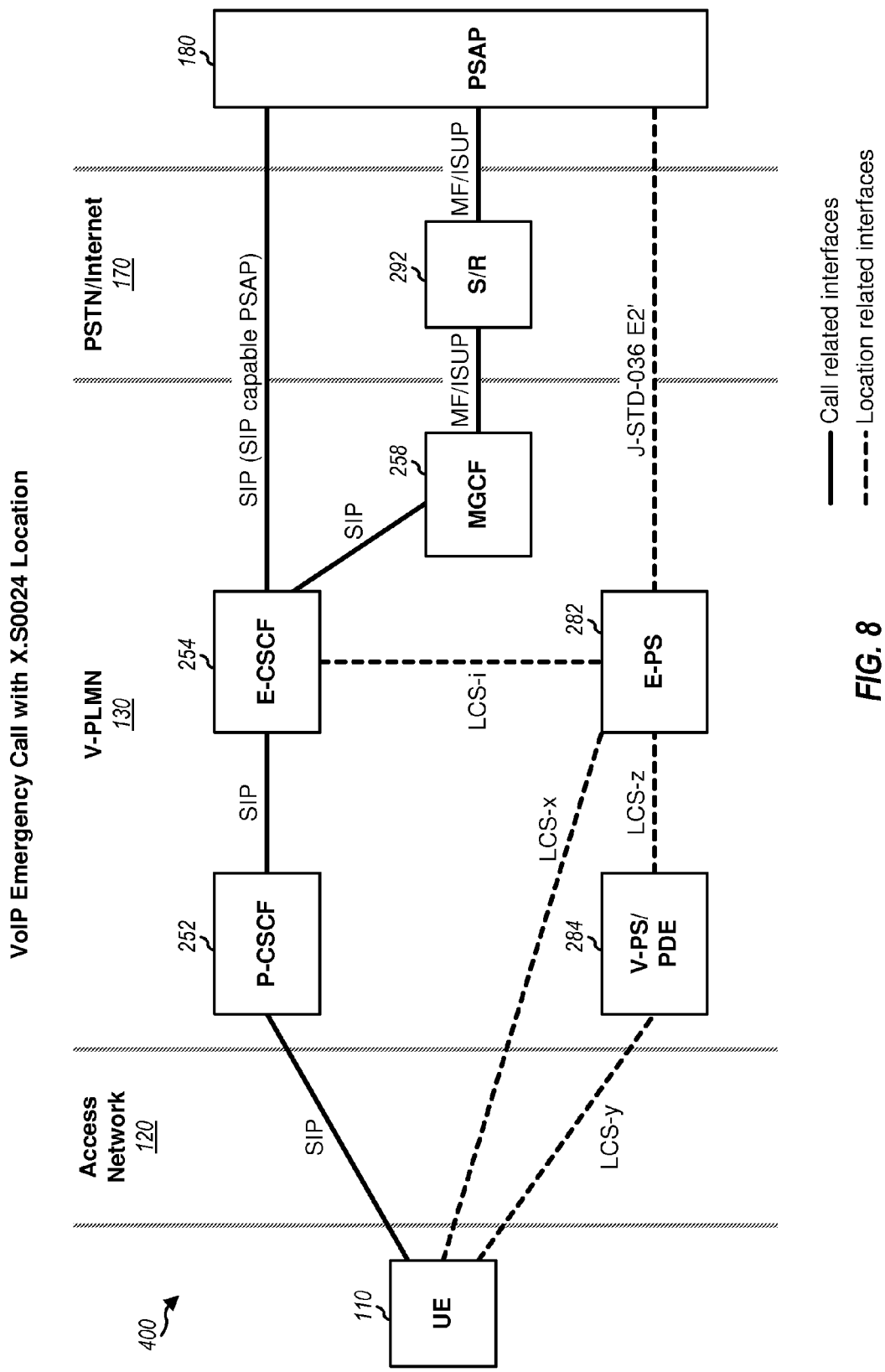
FIGS. 8 and 9 show a network architecture and a message flow, respectively, for emergency VoIP call with X.S0024 location.

FIG. 8 shows a block diagram of an embodiment of a network architecture 800 applicable for X.S0024 location for cdma2000 networks. Access network 120 may comprise a CDMA2000 1x network, a CDMA2000 1xEV-DO network, a 3GPP2 WLAN, and so on. V-PLMN 130 may include P-CSCF 252, E-CSCF 254 and MGCF 258 to support IMS (e.g., VoIP) and PDSN 242 for packet switched services (not shown). V-PLMN 130 may include E-PS 282 and V-PS/PDE 284 (as shown) and may also include E-SLP 272 and V-SLP 274 (not shown) for location services. E-PS 282 substitutes for an H-PS for location of emergency calls. E-PS 282 and V-PS/PDE 284 may reside in other networks.

In an embodiment, UE 110 communicates with E-PS 282 via an LCS-x interface and communicates with V-PS/PDE 284 via an LCS-y interface. E-PS 282 communicates with V-PS/PDE 284 via an LCS-z interface, communicates with E-CSCF 254 via an LCS-i interface, and communicates with PSAP 180 via the J-STD-036 E2' interface. The LCS-i interface may be similar to the RLP or Li/ILP for SUPL, the v2 interface in the NENA I2 solution, or some other interface. The protocol for the LCS-i interface may be ILP used for SUPL. The LCS-x, LCS-y and LCS-z interfaces are described in X.S0024.

3.1. Call Setup

Figure 9:
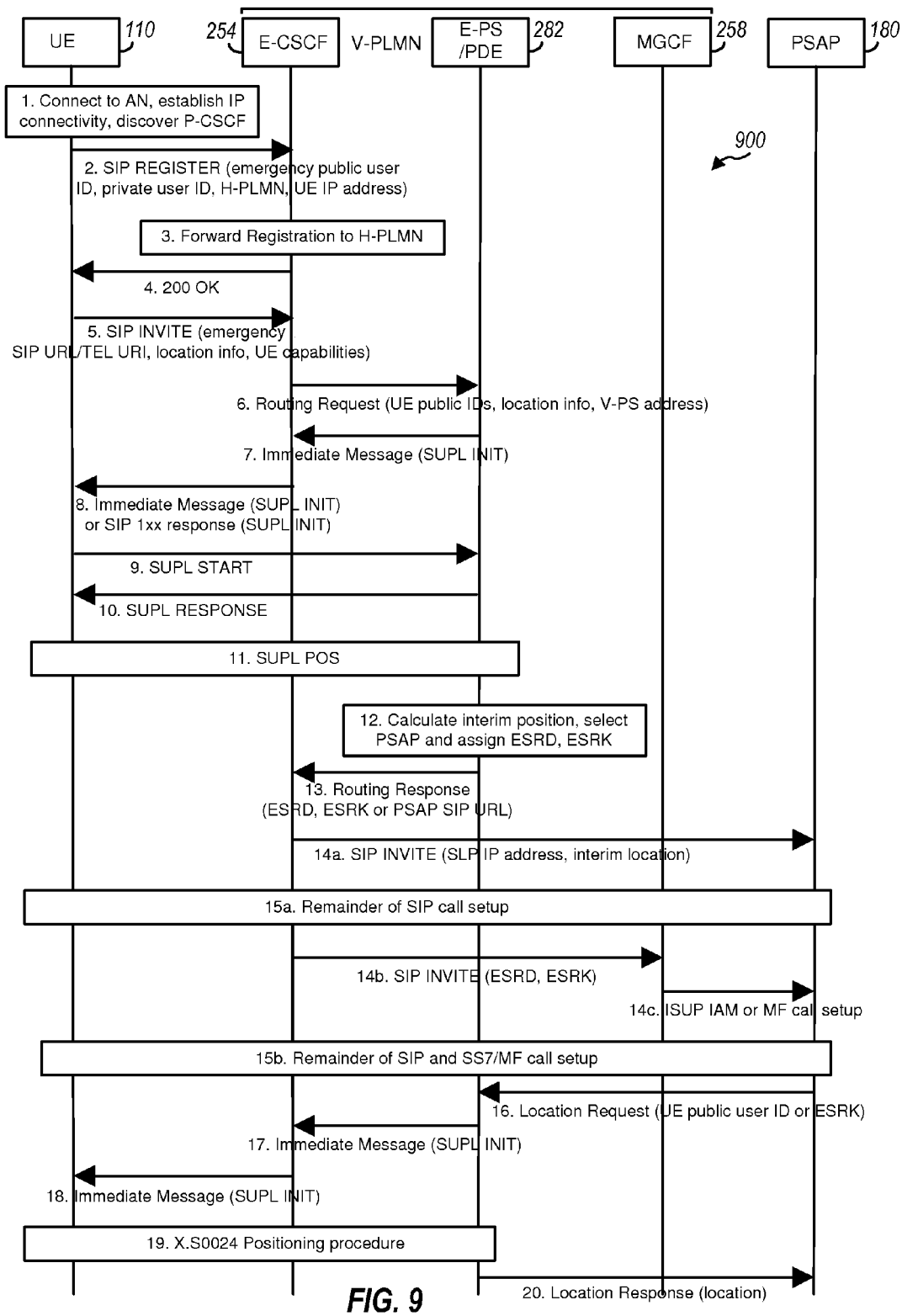

FIG. 9 shows an embodiment of a message flow 900 for emergency VoIP call setup using X.S0024. In step 1, UE 110 discovers and attaches to an access network, establishes IP connectivity, and may discover a local SIP server (e.g., P-CSCF 252), as described above for step 1 in FIG. 5. After access network connection, UE 110 may discover a V-PS address using a DNS query with a known V-PLMN domain name and V-PS identification (e.g., xs0024_vps@domain_name).

In step 2, UE 110 sends a SIP REGISTER to P-CSCF 252, which forwards the message to E-CSCF 254. In step 3, E-CSCF 254 forwards the SIP REGISTER to H-PLMN 160 where normal IMS registration occurs. In step 4, E-CSCF 254 (e.g., after receiving a 200 OK from H-PLMN 160) returns a 200 OK to UE 110. UE 110 may re-register if handed off to a different PCF, PDSN or WLAN within the same V-PLMN.

In an alternative embodiment of steps 2, 3 and 4, after UE 110 sends a SIP REGISTER to P-CSCF 252 in step 2, P-CSCF 252 may forward the SIP REGISTER directly to S-CSCF 264 or I-CSCF 262 in H-PLMN 160 and bypass E-CSCF 254 in V-PLMN 130. In this case, a SIP 200 OK from H-PLMN 160 would be returned to P-CSCF 252 rather than to E-CSCF 254, and P-CSCF 252 would return the 200 OK to UE 110 in step 4. This alternative embodiment may reduce or avoid special impacts to P-CSCF 252 to support VoIP emergency calls because P-CSCF 252 actions are then like those for normal registration.

In step 5, UE 110 sends a SIP INVITE to P-CSCF 252 (not shown), which forwards the SIP INVITE to E-CSCF 254. In step 6, E-CSCF 254 may determine that UE 110 supports X.S0024 and sends a Routing Request to E-PS 282 in the same or different network. The Routing Request may include the information described above for step 6 in FIG. 5 and the V-PS address if obtained during registration.

E-PS 282 proceeds to step 12 if the location information provided in step 6 enables E-PS 282 to derive a sufficiently accurate position estimate for UE 110. Otherwise, steps 7 through 11 are performed to obtain a suitable position estimate for UE 110. In step 7, E-PS 282 acts as an H-PS in performing subsequent X.S0024 location using procedures similar to those for (a) X.S0024 roaming support if a V-PS was selected or (b) X.S0024 non-roaming support if a V-PS was not selected. E-PS 282 generates an X.S0024 SUPL INIT to instigate a network initiated location procedure with UE 110. E-PS 282 may send the SUPL INIT directly to UE 110 using mobile terminated IP or UDP/IP, in which case step 8 is skipped. E-PS 282 may also send the SUPL INIT inside an Immediate message to E-CSCF 254. In either case, the SUPL INIT may include the positioning mode, QoP accuracy/delay for a fast interim position estimate, an E-PS IP address, an emergency call indication, and so on. Any E-PS address conveyed in the SUPL INIT overrides any H-PS address configured in UE 110.

In step 8, E-CSCF 254 forwards the SUPL INIT to UE 110 via P-CSCF 252 using IMS or SIP signaling. In step 9, UE 110 establishes a secure IP connection to E-PS 282, which may be the H-PS for UE 110 or may have included its IP address in the SUPL INIT in step 7. UE 110 then sends to E-PS 110 a SUPL START that may include the UE location capabilities, location information for UE 110, a position estimate for UE 110 (if available), and so on. E-PS 282 may proceed to step 12 and terminate the location transaction with UE 110 by sending a SUPL END if a position estimate with sufficient accuracy to determine a PSAP is received from UE 110 in step 9.

In step 10, E-PS 282 determines a suitable local PDE or a suitable remote V-PS to perform positioning based on the location information received in step 9 or other location information received in step 6. E-PS 282 also decides whether to use proxy or non-proxy mode. E-PS 282 then interacts with the V-PS or PDE for positioning and sends to UE 110 an X.S0024 SUPL RESPONSE that may include a PDE IP address if non-proxy mode is selected. In step 11, UE 110 exchange SUPL POS messages with the PDE for non-proxy mode or with E-PS 282 for proxy mode to continue and complete positioning as described in 3GPP2 X.S0024-0. The SUPL POS messages may carry embedded IS-801 messages. The positioning provides a position estimate for UE 110, which is passed to E-PS 282.

In step 12, E-PS 282 selects a PSAP (e.g., PSAP 180) and obtains an ESRD and an ESRK if PSAP 180 is PSTN capable. In step 13, E-PS 282 returns to E-CSCF 254 a Routing Response that may include a PSAP identity if PSAP 180 is IP capable, the ESRD and ESRK if PSAP 180 is PSTN capable, and a position estimate for UE 110 if requested by E-CSCF 254. E-PS 282 may store for UE 110 a call record containing all information collected for the UE. Steps 14*a* and 15*a* are performed if PSAP 180 is IP capable. Steps 14*b*, 14*c* and 15*b* are performed if PSAP 180 is PSTN capable. In step 16, after the call is established, PSAP 180 may send a Location Request for an accurate position estimate to E-PS 282, which may be identified by an IP address or name obtained in step 14*a* or an ESRK obtained in step 14*c*.

In step 17, E-PS 282 may open a new X.S0024 transaction with UE 110 by sending a SUPL INIT directly to UE 110 using mobile terminated IP or UDP/IP (in which case step 18 is skipped) or by sending to E-CSCF 254 an Immediate message containing an X.S0024 SUPL INIT with the parameters described in step 7 except for a QoP accuracy/delay for an accurate position estimate. In step 18, E-CSCF 254 transfers the SUPL INIT inside an IMS Immediate message, a SIP message or some other message to UE 110. In step 19, UE 110 establishes an IP connection (e.g., a secure IP connection) to E-PS 282 and returns a SUPL START to E-PS 282. E-PS 282 determines a suitable PDE or V-PS for positioning based on any location information in the SUPL START and on any other location information for UE 110. E-PS 282 then starts positioning by returning a SUPL RESPONSE to UE 110. UE 110 may then exchange SUPL POS messages with E-PS 282, a local PDE, and/or a remote PDE to perform positioning and obtain an accurate position estimate for UE 110. In step 20, E-PS 282 sends the accurate position estimate for UE 110 in a Location Response to PSAP 180.

UE 110 may thereafter communicate with PSAP 180 for the emergency VoIP call. When the call is later released, E-CSCF 254 may send an indication to E-PS 282, which may then release any record of the call. E-CSCF 254 or UE 110 may also de-register the emergency public user ID, which was registered in steps 2 through 4. Alternatively, E-CSCF 254, E-PS 282 and UE 110 may allow the registration and call records to persist for some period of time to support possible later callback from PSAP 180 to UE 110 and/or additional location requests.

Additional details for steps 1 through 8 and steps 12 through 20 of FIG. 9 may are described for steps 1 through 8 and steps 12 through 20, respectively, of FIG. 5.

Message flow 500 has the following features related to X.S0024.

(a) Addition of an E-PS address in an X.S0024 SUPL INIT, which overrides and replaces an H-PS address configured in UE 110 or the UIM.
(b) Interface between the IMS side (e.g., E-CSCF 254) and the location side (e.g., E-PS 282).
(c) Use of V-PS 284 and discovery of the V-PS address.
(d) Conveyance of an X.S0024 SUPL INIT using mobile terminated IP, UDP/IP, SIP signaling or IMS signaling.
(e) Addition of an emergency services indication in the X.S0024 SUPL INIT.
(f) Use of a new protocol between E-CSCF 254 and E-PS 282, which may be similar to OMA RLP or PS-PS protocol on LCS-z interface in X.S0024.
(g) Security.

4. Support of UEs without UICC/UIM and/or Roaming Agreement

The description above assumes that UE 110 has a UICC or UIM and that H-PLMN 160 and V-PLMN 130 have roaming agreement, which permit UE registration in V-PLMN 130 and subsequent emergency call access to PSAP 180. If this is not the case, then UE 110 may access and register in V-PLMN 130 and may complete call setup to PSAP 180 and possible callback from PSAP 180 as described below. Callback from PSAP 180 in the UICC/UIM-less case is possible for VoIP but generally not possible for circuit-switched emergency access due to inability to page an unregistered UE.

Figure 10:
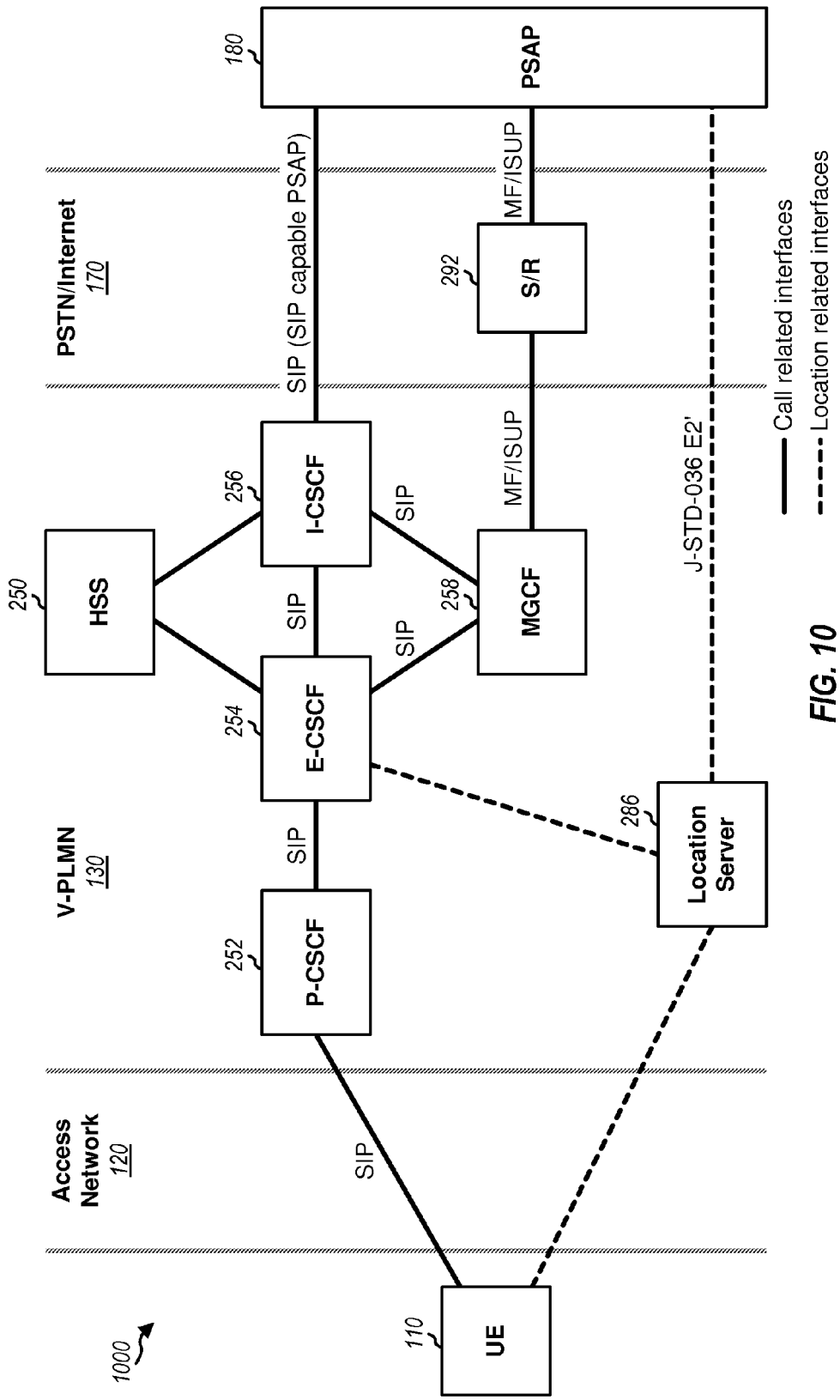
FIGS. 10 and 11 show a network architecture and a message flow, respectively, for emergency VoIP call for a UE without service subscription.

FIG. 10 shows a block diagram of an embodiment of a network architecture 1000 supporting emergency VoIP call setup and PSAP callback for a UE without a UICC/UIM. Network architecture 1000 includes some of the entities shown in FIGS. 2 and 3. Network architecture 1000 also includes a location server 286, which may be an SLP, a GMLC, a PS, or some other location entity.

4.1. Access

UE 110 may gain GPRS access, 3GPP WLAN access, or IMS access without a UICC. UE 110 may also gain cdma2000 access, 3GPP2 WLAN access, or IMS access without a UIM. UE 110 may perform different procedures for different types of access.

For GPRS access, UE 110 may perform PDP context activation for emergency services without a UICC and/or without roaming agreement in V-PLMN 130 as described in 3GPP TR 23.867. GPRS attach may be achieved using a pseudo IMSI, which may register UE 110 in HSS 250 in V-PLMN 130, which in turn may help support inter-SGSN handover. If UE 110 has no UICC, then the pseudo IMSI may be created with a unique MCC-MNC combination and digits from an IMEI. If UE 110 has a UICC but no roaming access to V-PLMN 130, then the pseudo IMSI may be created with digits from the IMSI rather than the IMEI, which may avoid duplicate pseudo IMSIs if all IMSI digits are used. GPRS attach may also be achieved using the IMEI as an identification.

For 3GPP WLAN access, UE 110 may create a pseudo NAI from a pseudo IMSI (e.g., the same pseudo IMSI used for GPRS attach), as follows:

Pseudo NAI="n<pseudo IMSI>@V-PLMN_network_domain"

where n is a fixed digit in the range of 2 to 9 indicating use of a non-authenticable pseudo NAI for an emergency call (0 or 1 are already taken for normal NAIs). UE 110 may use the pseudo NAI for initial access and AAA procedure.

The WLAN may advertise V-PLMNs capable of supporting AAA using the pseudo NAI for emergency services or may present the V-PLMNs in a prioritized order indicating capability and willingness to support this. V-PLMN 130 may treat UE 110 as a temporary home subscriber and may either skip AAA or ensure that it succeeds (e.g., by using well known keys to ensure that authentication succeeds). It may be desirable to follow normal procedures as far as possible and to register UE 110 in HSS 250 in order to better support WLAN reselection and handover.

For cdma2000 access, UE 110 may establish a PPP session with PDSN 242 and may reject authentication during PPP establishment by returning a Link Control Protocol (LCP) Configure Reject in reply to an LCP Configure Request from PDSN 242, e.g., as described in IETF RFC 1661. PDSN 242 may support emergency calls for UIM-less or unauthenticated UEs and may continue PPP session establishment without authenticating UE 110. PDSN 242 may assign a simple IP address to UE 110 and may apply IP packet filtering to restrict the entities with which UE 110 can communicate. For example, PDSN 242 may restrict UE 110 to communicating with local servers (e.g., a DHCP server, a DNS server, and P-CSCF 252) and with entities associated with PSAP access but not open Internet access.

PDSN 242 may be informed of an emergency call in several manners. In an embodiment, UE 110 sends to PDSN 242 an IPCP Configure Request containing a unique IP address that is defined globally to indicate an IP address request for an emergency call. In other embodiments, indications may be used in PPP establishment, or PDSN 242 may receive an indication of an emergency call request from the RAN (RRC/PCF 222) via cdma2000 A10 interface. In any case, PDSN 242 may assign a simple IP address to an unauthenticated UE for an emergency call and may employ special filtering as described above. This IP address assignment may be achieved via an enhancement to the PPP IPCP described in IETF RFC 1332. If UE 110 does not indicate an emergency call, then PDSN 242 may disallow PPP establishment and IP address assignment.

Instead of rejecting authentication, UE 110 may allow authentication to proceed using either a Password Authentication Protocol (PAP) or a Challenge-Handshake Authentication Protocol (CHAP), which are described in IETF RFC 1334 and RFC 1994, respectively. UE 110 may receive a CHAP Challenge or a PAP Authenticate Request and may send a response that includes an identity that indicates an emergency call from a UIM-less UE. This identity may be the pseudo IMSI used for 3GPP2 WLAN access. If the identity indicated V-PLMN 130 as the domain for UE 110, then CHAP or PAP authentication may proceed in the normal manner from the perspective of PDSN 242 to AAA server 246 in V-PLMN 130. AAA server 246 may recognize the pseudo IMSI as indicating emergency call access and may forego the normal authentication or may perform the authentication using known keys. AAA server 246 may ensure that restricted filtering is used by PDSN 242 to restrict IP access, e.g., to allow an emergency VoIP call but not other types of access.

PDSN 242 may construct an NAI for accounting and/or record keeping. PDSN 242 may use the UE's unique international identity (an IMSI, MIN, or International Roaming MIN-IRM) if UE 110 has a UIM. PDSN 242 may also use an ESN or other identification for UE 110.

For 3GPP2 WLAN access, after UE 110 accesses the WLAN, an access point or an authentication entity may initiate authentication of UE 110 and may send an Extensible Authentication Protocol (EAP) Request or some other request for the identity of UE 110. UE 110 may respond by returning an EAP Response or some other response containing the UE's identity, e.g., in the form of user@domain where the domain identifies the H-PLMN of UE 110. If UE 110 has no UIM or no roaming agreement in V-PLMN 130, then UE 110 may return a pseudo identity that may be the same as, or similar to, the pseudo NAI used for 3GPP WLAN. For example, the user (e.g., pseudo IMSI) portion of the pseudo identity may contain digits from the UE's unique international identity (e.g., an IMSI, MIN or IRM) if UE 110 has a UIM or digits from the unique terminal ID (e.g., an ESN) otherwise. The user portion may also contain a unique prefix (e.g., a unique digit) to indicate that it is a pseudo identity for emergency calls. The domain portion of the pseudo identity may indicate V-PLMN 130.

The access point or authentication entity may continue authentication using a local AAA server, e.g., AAA server 246. The authentication may run normally using known keys or may be truncated since genuine authentication does not take place. Once the pseudo authentication is completed, the access point or associated router may employ packet filtering to limit access by UE 110, as described above.

UE 110 may access the WLAN, perform pseudo authentication, and discover a PDIF. UE 110 may then identify itself to the PDIF (or the local AAA server) using a pseudo identity, e.g., in the place of an NAI used for cdma2000 UE-PIDF authentication. The pseudo identity may be the same or similar to the one used for WLAN authentication. Normal authentication and tunnel establishment may then proceed (e.g., as described in 3GPP2 X.P0028-200) using the local AAA server and employing known keys to achieve some transparency for the PDIF. Alternatively, authentication may be truncated or aborted. After authentication, the PDIF may employ packet filtering to limit access by UE 110.

The WLAN may advertise V-PLMNs capable of supporting the above procedures or may present the V-PLMNs in a prioritized order indicating capability and willingness to support this.

For IMS access, SIP registration may be skipped if UE 110 has no UICC/UIM and/or no roaming agreement in V-PLMN 130, as described in 3GPP TR 23.867 and 3GPP2 X.P0013-002A. This enables emergency call setup to a PSAP but does not support callback. Alternatively, UE 110 may register by sending a SIP REGISTER containing a V-PLMN domain name and an emergency private user ID, which may be created using the V-PLMN domain name and a pseudo IMSI. This SIP REGISTER would be recognized in E-CSCF 254 and HSS 250 but could be transparent to other entities.

The registration procedure may then proceed as far as conveying the SIP REGISTER from UE 110 to E-CSCF 254 (or other IMS server) in V-PLMN 130. Registration in H-PLMN 160 is not performed, but E-CSCF 254 would register UE 110 in HSS 250 in V-PLMN 130. HSS 250 may assign a temporary TEL URI and/or a temporary SIP URI (from a pool in HSS 250) as temporary public user identities. The TEL URI may be conveyed to PSAP 180 in the call setup if signaling was over the PSTN, and the SIP URI may be conveyed for SIP call setup. The URI would enable callback from PSAP 180 if the IMS registration and IP connectivity are maintained by both V-PLMN 130 and UE 110 for some period following termination of the emergency call. The TEL URI and SIP URI are recognized by PSAP 180 as temporary addresses due to differences from normal permanent addresses, since they are not used to globally identify UE 110. HSS 250 may "quarantine" temporary addresses returned from completed emergency calls and not reassign these addresses for a period of time to avoid PSAP callbacks being mis-routed to wrong UEs.

PSAP callback may be supported in several manners. If UE 110 is registered in H-PLMN 160, then callback from PSAP 180 may use the SIP URI or TEL URI public user identity of UE 110 and may be routed initially to H-PLMN 160, as described in 3GPP TS 23.228 or 3GPP2 X.P0013. For a SIP capable PSAP, the SIP INVITE may be routed to I-CSCF 262 in H-PLMN 160 (based on the H-PLMN domain name in the UE's SIP URI). I-CSCF 262 may query HSS 250 for S-CSCF 264 in H-PLMN 160 and may then route the call to S-CSCF 264. S-CSCF 264 may then route the call to E-CSCF 254 or P-CSCF 252 in V-PLMN 130 based on previous registration information. In the former case, E-CSCF 254 may be treated by S-CSCF 264 as a P-CSCF and may route the call via P-CSCF 252 to UE 110. In the latter case, P-CSCF 252 may route the call to UE 110. For a PSTN capable PSAP, the call may be routed through the PSTN to an MGCF in H-PLMN 160 based on the TEL URI of UE 110. The MGCF may inter-operate between PSTN and SIP signaling and may send a SIP INVITE to I-CSCF 262 in H-PLMN 160. The call routing from I-CSCF 262 to UE 110 would then proceed in the same manner as for a SIP capable PSAP.

If UE 110 is not registered in H-PLMN 160 (e.g., because of no UICC/UIM and/or no roaming agreement with V-PLMN 130), then UE 110 may be registered in HSS 250 in V-PLMN 130. HSS 250 may assign a temporary TEL URI or SIP URI public user identity to UE 110. Callback from the PSAP may then be routed to either I-CSCF 256 for a SIP capable PSAP or MGCF 258 for a PSTN capable PSAP, without involving H-PLMN 160.

4.2. Call Setup

Figure 11:
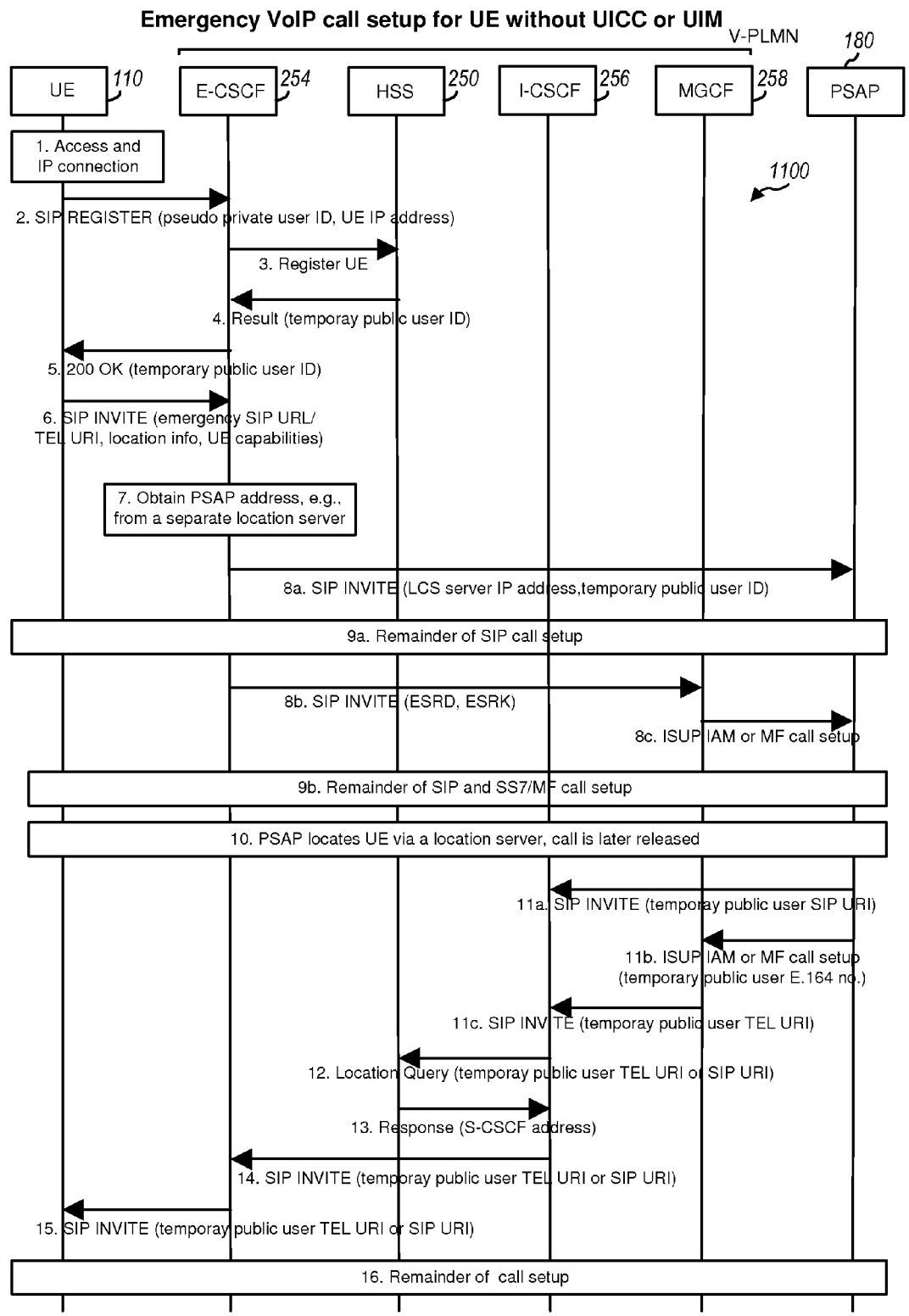

FIG. 11 shows an embodiment of a message flow 1100 for emergency VoIP call setup for a UE without a UICC/UIM. Message flow 1100 may be used for 3GPP control plane location, SUPL, and X.S0024.

In step 1, UE 110 discovers and attaches to an access network, establishes IP connectivity, and may discover a local SIP server (e.g., P-CSCF 252), as described above. UE 110 may employ a pseudo IMSI for GPRS or cdma2000 access, a pseudo NAI for WLAN access, a pseudo identity for 3GPP2 WLAN access. UE 110 may register in HSS 250 in V-PLMN 130 using the pseudo identity (e.g., a pseudo IMSI).

In step 2, UE 110 attempts to register in the V-PLMN IMS network by sending a SIP REGISTER to P-CSCF 252, which was discovered in step 1. For UICC/UIM-less or non-roaming, the SIP REGISTER may include an emergency services indication, the V-PLMN domain name, the UE IP address obtained in step 1, an emergency private user ID created using the V-PLMN domain name and the pseudo IMSI (for GPRS) or pseudo identify (for cdma2000), and/or other information. For re-registration, the SIP REGISTER may further include a temporary public user ID assigned in the initial registration. Due to the presence of the emergency services indication or the emergency private user ID (which may indicate V-PLMN 130 as the home network for UE 110), P-CSCF 252 forwards the SIP REGISTER to E-CSCF 254, which supports emergency service calls, in the same network. The forwarded SIP REGISTER may include location information for UE 110. The SIP REGISTER may also include a V-SLP or SGSN address (for 3GPP) or a V-SLP, PDSN or PIDF address (for 3GPP2).

In step 3, because the emergency private user ID for UE 110 references V-PLMN 130, E-CSCF 254 forwards the registration information to HSS 250, e.g., in a Cx-Put/Cx-Pull. In step 4, HSS 250 verifies if the emergency private user ID is already registered, e.g., if UE 110 already registered or another UE registered with the same private user ID. HSS 250 may use the temporary public user ID, if provided, to distinguish UEs that have the same emergency private user ID due to common UE entity digits (e.g., common IMEI or ESN digits) and to distinguish an initial registration (with no temporary public user assigned) from a re-registration. For an initial registration, HSS 250 stores the emergency private user ID and the E-CSCF address and assigns a temporary public user SIP URI and/or TEL URI, which are returned to E-CSCF 254.

In step 5, E-CSCF 254 returns a 200 OK to UE 110 via P-CSCF 252. The 200 OK may include the temporary public users IDs assigned by HSS 250. UE 110 may re-register if handed off to a different SGSN (for GPRS access), a different PCF or PDSN (for cdma2000 access), a different WLAN (for WLAN access) within V-PLMN 130. In step 6, UE 110 sends to P-CSCF 252 a SIP INVITE that may include a global SIP URL or TEL URI indicating an emergency call, the type of emergency service needed, and the temporary public user IDs received in step 5 if UE 110 has no UICC/UIM and/or no roaming access to V-PLMN 130. P-CSCF 252 forwards the SIP INVITE to E-CSCF 254. In step 7, E-CSCF 254 interacts with location server 286 to obtain PSAP routing information for the call (e.g., PSAP SIP URI, or ESRD and ESRK), as described for steps 6 to 13 of FIGS. 5 and 9 and steps 9 to 13 of FIG. 7.

Steps 8a and 9a are performed if PSAP 180 is IP capable. In step 8a, E-CSCF 254 routes the SIP INVITE to PSAP 180 using a SIP URI. The SIP INVITE may include any interim position estimate for UE 110, the IP address or name of location server 286, and the temporary public user SIP URI assigned to UE 110. In step 9a, additional SIP signaling may be exchanged to establish the emergency call.

Steps 8b, 8c and 9b are performed if PSAP 180 is PSTN capable. In step 8b, E-CSCF 254 forwards the SIP INVITE via a BGCF to MGCF 258. The SIP INVITE may include the ESRD and ESRK and possibly a temporary public user TEL URI assigned to UE 110. In step 8c, MGCF 258 routes the call to PSAP 180 over the PSTN, possibly via a selective router, using SS7 ISUP and/or MF signaling. The ESRD or ESRK are used as routing numbers and the ESRK is passed to PSAP 180 as the identity of UE 110 and as a key to obtain more information. A temporary public user E.164 number may also be passed to PSAP 180 if allowed by the signaling capabilities. E.164 is an ITU-T standard that defines the international telephone numbering system, and an E.164 number is composed of a country code plus a national number. In step 9b, additional SIP signaling may be exchanged and interworking with SS7 ISUP and/or MF at MGCF 258 may occur to establish the call.

In step 10, PSAP 180 may obtain an accurate position estimate for UE 110 by querying location server 286, which may be indicated by the SIP URI or ESRK in the call setup. The response from location server 286 may include any temporary public user E.164 number assigned to UE 110, if PSAP 180 is PSTN capable and if this number was not passed to PSAP 180 in the call setup. The call may be released some time later, e.g., dropped due to temporary loss of radio coverage. E-CSCF 254 may then wait for a period of time before informing location server 286 in order to support location of UE 110 by PSAP 180 for a subsequent callback.

PSAP 180 attempts to call back UE 110 using its temporary public user ID. Step 11a is performed for a SIP capable PSAP. In step 11a, PSAP 180 sends a SIP INVITE to I-CSCF 258, which may be indicated by the network domain part of the temporary public user SIP URI assigned to UE 110. Steps 11b and 11c are performed for a PSTN capable PSAP. In step 11b, PSAP 180 sends an ISUP IAM (or MF call setup) to MGCF 258, which may be indicated by the first digits in the temporary public user E.164 number assigned to UE 110. In step 11c, MGCF 258 sends to I-CSCF 258 a SIP INVITE containing a TEL URI constructed from the E.164 number received in step 11b.

In step 12, I-CSCF 258 sends to HSS 250 a location query that may include the temporary public user SIP URI received in step 11a or the temporary public user TEL URI received in step 11c. In step 13, HSS 250 finds the UE registration information and returns the address of E-CSCF 254 to I-CSCF 258. In step 14, I-CSCF 258 forwards the SIP INVITE to E-CSCF 254. In step 15, E-CSCF 254 locates the P-CSCF address and sends the SIP INVITE via P-CSCF 252 to UE 110. In step 16, call setup continues as in a normal case.

UE 110 may thereafter communicate with PSAP 180. When or some time after the call is later released, E-CSCF 254 may send an indication to location server 286, which may then release any record of the call.

5. Support of Geographically Remote Legacy PSAP

In some cases, the V-PLMN and/or the SIP server (e.g., E-CSCF 254) may be geographically remote from UE 110. In such cases, it may not be possible to route the call via a local MGCF to a PSTN capable PSAP if the PSTN does not support access to remote PSAPs. The following may be used to address these cases.

In an embodiment, the emergency call is redirected to a different V-PLMN. Early in the processing of the SIP INVITE, an E-CSCF or a location server (e.g., an E-SLP, a GMLC, etc.) may determine that the call should be redirected to a call server in another network. In that case, a SIP 3xx Redirect response (e.g., 305 use proxy) containing the SIP URI(s) of the preferred alternative server(s) may be returned to UE 110. UE 110 may then reattempt the call procedures as described above, although the access and IP connectivity procedures may be skipped if the same access network can still be used. If the call setup procedure has advanced as far as determining an interim position estimate and/or the correct PSAP (e.g., ESRD, SIP URI or IP address), then the E-CSCF may include these in the redirect response. UE 110 may then include the information in the SIP INVITE sent to the new PLMN, which may avoid extra delay to obtain the same information and allow for use of PLMNs without the capability to obtain this information. The original E-CSCF may notify the location server (e.g., E-SLP or GMLC), which may then remove the call record for UE 110.

In another embodiment, the E-CSCF forwards the call to a SIP server in another network (or the same network) closer to a PSAP from where the call can be better forwarded into the PSTN. The V-PLMN may continue to support all the functions previously described including location functions and support for UEs without UICC or UIM. The forwarded SIP INVITE may include the PSAP identity (e.g., SIP URI or ESRD), any ESRK assigned by the location server and any temporary public user IDs assigned for a UICC-less UE. The PSAP may continue to query the location server in the V-PLMN for location information and any callback may be sent via the H-PLMN to the V-PLMN for the normal case or directed to the V-PLMN in the UICC-less case. The continuing support of these functions in the V-PLMN avoids demands on the subsequent SIP server and should enable a larger number of other networks to support the forwarding service.

In yet another embodiment, Local Number Portability may be used, e.g., in North America. In addition to returning the ESRD and ESRK, the location server (e.g., E-SLP or GMLC) may return an LRN (Location Routing Number) to the IMS network (e.g., E-CSCF) that corresponds to a LEC exchange or PSAP selective router from which the PSAP may be reached directly. As an alternative, the IMS network (e.g., E-CSCF or MGCF) may obtain the LRN from the ESRD. The LRN is included in the information sent to the MGCF (if not obtained by the MGCF), and the MGCF sends to the PSTN an ISUP IAM containing the following parameters:

Called Party Number=LRN,
Generic Address Parameter (GAP)=ESRD,
FCI parameter bit M set to "number translated",
Calling Party Number=UE MSISDN or ESRK, and
Calling Party's Category set to "emergency service call" (optional).

Due to support of number portability by PSTNs (e.g., throughout the US), the call (ISUP IAM) may be correctly routed to the intended LEC CO or selective router provided SS7 rather than MF trunks may be used throughout. The destination LEC CO or selective router may support number portability and may recognize the LRN as its own upon receiving the call and may obtain the true called party number (the ESRD) from the GAP. Uniqueness of the ESRD or the Calling Party's Category setting may inform the LEC CO or selective router that this is an emergency call. At that point, the call may be routed to the PSAP as if it had originated locally. This embodiment avoids new impacts to PSTN toll switches (e.g., no routing changes) but may impact LEC COs and selective routers.

6. Security for SUPL and X.S0024

For SUPL, security procedures may be established to support E-SLP 272 replacing the H-SLP for positioning for both roaming and non-roaming scenarios and with proxy or non-proxy mode. Existing SUPL security procedures are generally based on shared keys in both UE 110 and the H-SLP and/or based on other information provisioned in UE 110 concerning the H-SLP (e.g., fully qualified domain name, root X.509 public key certificate, etc.). Such information may not be available to E-SLP 272. For E-SLP 272, authentication for proxy and non-proxy modes may be supported as described below.

For X.S0024, security procedures may also be established to support E-PS 282 replacing the H-PS for positioning. Existing X.S0024 security procedures are described in 3GPP2 X.S0024-0 and in 3GPP2 S.P0110-0. These procedures make use of a common root key provisioned in both the H-PS for a user and in the user's UIM. Additional keys may be derived from the provisioned root key as follows:

(a) Key to support Secure Store and Forward Encapsulation (S-SAFE) in which a SUPL INIT is sent to UE 110 using SMS or WAP Push and is authenticated (as coming from the H-PS) and optionally ciphered.

(b) Key to support a secure IP connection between UE 110 and the H-PS in which X.S0024 messages are sent between UE 110 and the H-PS with ciphering and authentication.

(c) Key to support a secure IP connection between UE 110 and a PDE for non-proxy mode in which X.S0024 messages are sent between UE 110 and the PDE with ciphering and authentication.

Each of the three keys described above is fixed in the sense that there is a deterministic value for any value of the root key. However, from each of these fixed keys, additional keys may be derived for ciphering and authentication whose values depend on random numbers provided for a particular positioning session by the UE and H-PS or PDE. This key derivation and the accompanying security procedures make use of the Transport Layer Security (TLS) procedure described in IETF RFC 2246 and the PSK-TLS variant of this described in IETF draft "Pre-Shared Key Ciphersuites for Transport Layer Security (TLS)". If X.S0024 is used for positioning in an emergency VoIP call and E-PS 282 is not the H-PS, then it is no longer possible to rely upon a common pre-configured root key in both UE 110 and E-PS 282 for mutual authentication and ciphering.

For SUPL, UE 110 may authenticate E-SLP 272 to avoid unauthorized access to UE location even during an emergency call. For X.S0024, UE 110 and E-PS 282 may perform mutual authentication. Table 2 lists five authentication methods, designated as methods A, B, C, D and E, and the characteristics of each method.

TABLE 2

Authentication Methods

| Characteristic | Method A | Method B | Method C | Method D | Method E |
|---|---|---|---|---|---|
| Authenticate E-SLP | No | Yes | Yes | Yes | Yes |
| Authenticate UE | No | Limited | Yes | Yes | Yes |
| Support roaming | Yes | Yes | Yes | Yes | No |
| H-PLMN impact | No | No | No | Yes | Yes |
| Secure UE connection to IMS needed | No | No | Yes | No | No |
| UICC/UIM-less support | Yes | Yes (note 1) | Limited | No | No |

(note 1): assumes that public key root certificates are provisioned in a Mobile Equipment (ME)

Method A provides minimal authentication. UE 110 allows network initiated SUPL or X.S0024 location from a non-authenticated E-SLP or E-PS if the SUPL INIT message indicates location for an emergency session and UE 110 is currently engaged in an emergency session. The restriction to emergency session provides some protection. For SUPL, UE 110 may select method A by not invoking security procedures with E-SLP 272. In this case, E-SLP 272 can still verify the UE identity, to a limited extent, through a SUPL INIT hash code contained in a SUPL POS INIT. In addition, the IP address of UE 110 provided to E-SLP 272 by E-CSCF 254 may provide some further assurance of the correct UE identity. For X.S0024 and SUPL, the transfer of the SUPL INIT via IMS or SIP (if direct transfer via mobile terminated IP or UDP/IP is not used) may provide some additional confidence in the UE authenticity, since IMS and SIP transfer relies on support and verification from V-PLMN 130 and/or H-PLMN 160.

Method B is for TLS public key authentication. UE 110 and E-SLP 272 or E-PS 282 support public key authentication using TLS as described in IETF RFC 2246 and as also described an alternative client authentication mechanism in OMA SUPL 1.0, "Secure User Plane Location Architecture". This mechanism supports authentication of the H-SLP or E-PS by a UE using TLS with ITU X.509 public key certificates sent by the H-SLP or E-PS to the UE during a TLS handshake phase. The public key certificates provide a chain of digital signatures, each signature authenticating the next, such that the UE can authenticate the public key of the E-SLP or E-PS provided the UE is provisioned with the public key of at least one root certification authority. The public key authentication TLS procedure supports transfer of symmetric keys for use in subsequent ciphering and authentication of signaling, e.g., for subsequent SUPL messages. Authentication and ciphering between UE 110 and an SPC or PDE for non-proxy mode may also be supported with these keys or by deriving additional keys from these keys. Method B relies on certification of the E-SLP or E-PS public key(s) by one or more root certification authorities (e.g., defined by OMA) and provisioning of the key(s) in UEs supporting SUPL or X.S0024 for emergency VoIP calls. This ensures authentication of E-SLP 272 or E-PS 282 by UE 110 and, for SUPL, limited authentication of UE 110 by E-SLP 272 via a 64-bit SUPL INIT hash included in a SUPL POS INIT and sent by UE 110 to E-SLP 272.

For method B, UE 110 (e.g., UICC or UIM) may be provisioned with one or more root public key certificates enabling the UE to verify the public key(s) of E-SLP 272 or E-PS 282. UE 110 and E-SLP 272 or E-PS 282 may establish a shared ciphering key and a message authentication code (MAC) key using TLS procedures described in RFC 2246 and one or more secure public key transfer procedures, e.g., RSA, DSS, or Diffie-Hellman. Ciphering and authentication of SUPL or X.S0024 messages may be performed after establishment of a secure TLS connection. For non-proxy mode, the method defined for 3GPP2 non-proxy mode in SUPL 1.0 may be used to generate a shared key for authentication and ciphering, according to IETF PS K-TLS, between UE 110 and a V-SPC or H-SPC in SUPL or between UE 110 and a PDE in X.S0024.

Method C is for PSK-TLS authentication. UE 110 and E-SLP 272 or E-PS 282 support PSK-TLS (e.g., as described in SUPL 1.0 for 3GPP2 SETs or 3GPP2 X.S0024-0 and S.P0110-0) according to IETF draft "Pre-Shared Key Ciphersuites for Transport Layer Security (TLS)". A pre-shared key (PSK) may be generated from (a) information (e.g., random information) contributed by UE 110, the IMS network (e.g., E-CSCF 254) and/or E-SLP 272 or E-PS 282, (b) information (e.g., SIP parameters) sent by or to UE 110 during SIP establishment of the emergency call, (c) security information already present in P-CSCF 252 and UE 110 to support secure IMS access from UE 110 (e.g., using IPsec, PSK-TLS, TLS), and/or (d) other information. The security information in (c) may be available if UE 110 registers with the H-PLMN IMS network via V-PLMN 130.

The PSK or the information used to derive it may be made available to UE 110 and E-SLP 272 or E-PS 282 during SIP registration and/or initiation of a SIP emergency call and may be used for SUPL or X.S0024 location using PSK-TLS. The trust relationship established during registration and SIP call setup between these entities is used to obtain a secure PSK or common information from which a secure key may be derived. For SUPL, mutual authentication of UE 110 and E-SLP 272 may then be supported using PSK-TLS when the UE establishes an IP (PSK-TLS) connection to E-SLP 272 following transfer of the SUPL INIT from E-SLP 272 to UE 110. For X.S0024, the secure PSK may be used as a root key from which remaining security information may be derived as described in 3GPP2 X.S0024-0 and S.P0110-0.

Method C relies on a secure connection between UE 110 and IMS during SIP registration and/or SIP call setup, which implies registration of UE 110 in V-PLMN 130 and H-PLMN 160 and mutual authentication of UE 110 and V-PLMN 130. If UE 110 does not have an UICC/UIM or if there is no roaming agreement between V-PLMN 130 and H-PLMN 160, mutual authentication of and secure transmission between V-PLMN 130 and UE 110 may not be achieved during SIP registration and SIP call setup, and any PSK generated will provide more limited protection.

Method D is for authentication with a Generic Bootstrap Architecture (GBA) described in 3GPP TS 33.220 or 3GPP2 TSG-S draft S.P0109. UE 110 and E-SLP 272 or E-PS 282 support GBA. This enables UE 110 and E-SLP 272 or E-PS 282 to obtain a secure shared key from H-PLMN 160. For SUPL, this key may be used to support PSK-TLS mutual authentication between UE 110 and E-SLP 272, as described in 3GPP TS 33.222 or 3GPP2 TSG-S draft S.P0114. This method is used in SUPL 1.0 to support 3GPP proxy mode. The key may also be used to support TLS with HTTP Digest authentication (e.g., as described in 3GPP TS 33.222), just HTTP Digest authentication between UE 110 and E-SLP 272 (e.g., as described in 3GPP2 TSG-S draft S.P0114), or other forms of authentication. For X.S0024, this key may be used as a root key from which remaining security information may be derived.

Method D relies on support of GBA in H-PLMN 160 as well as V-PLMN 130 and roaming agreement between V-PLMN 130 and H-PLMN 160 to enable transfer of key information from a Bootstrapping Serving Function (BSF) in H-PLMN 160 to an E-SLP Network Application Function (NAF) in V-PLMN 130.

Method E is for SUPL 1.0 or X.S0024 authentication. For SUPL, if UE 110 is in H-PLMN 160, then E-SLP 272 may be the H-SLP, and existing authentication mechanisms defined in SUPL 1.0 may be used. For X.S0024, if UE 110 is in H-PLMN 160, then E-PS 282 may be the H-PS, and existing authentication mechanisms defined in X.S0024 may be used.

Figure 12:
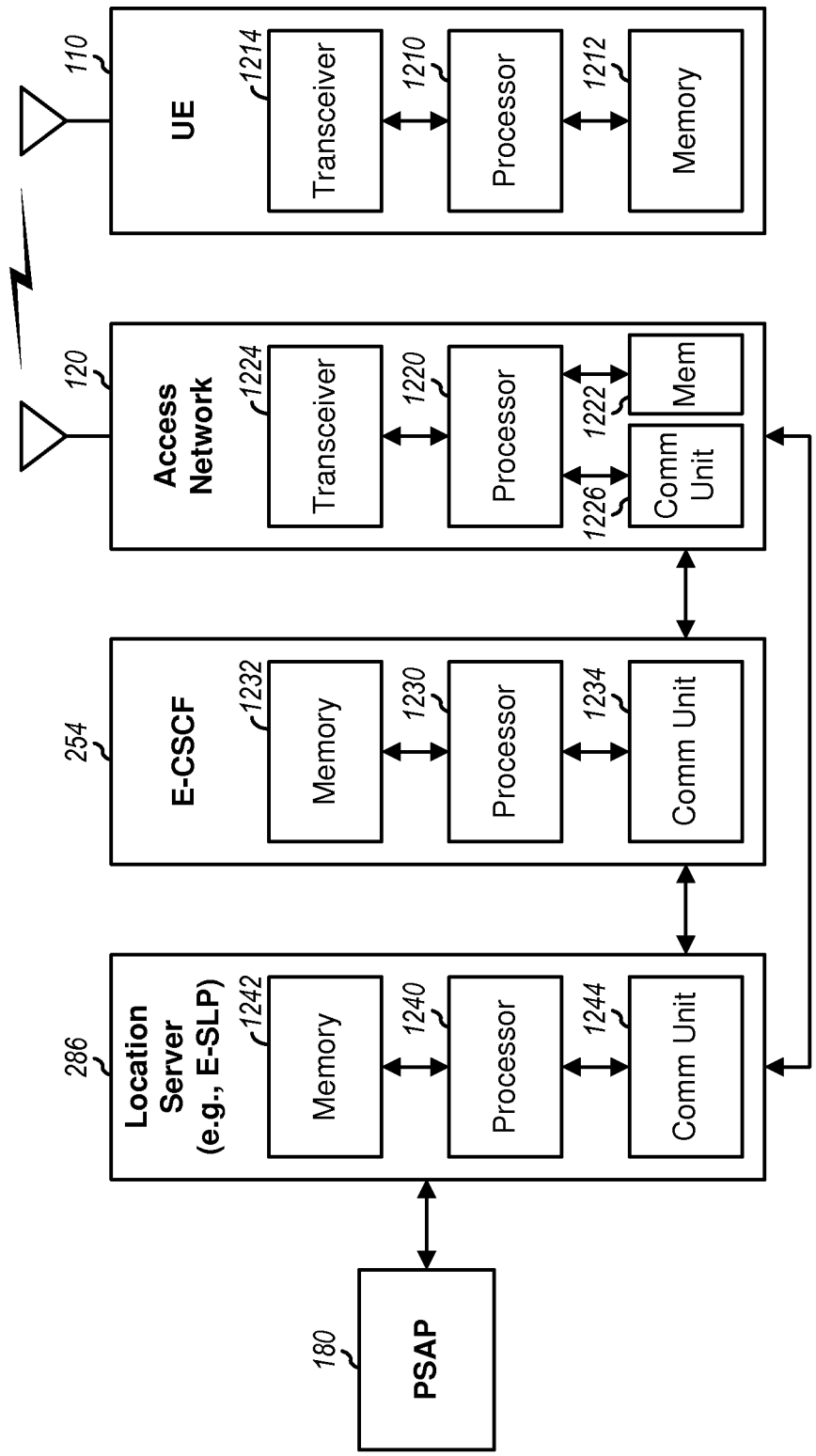
FIG. 12 shows a block diagram of several entities in FIGS. 1 through 3.

FIG. 12 shows a block diagram an embodiment of UE 110, access network 120, E-CSCF 254, and location server 286. Location server 286 may be E-SLP 272, GMLC 276, E-PS 282, and/or some other entity. For simplicity, FIG. 12 shows only one processor 1210, one memory unit 1212, and one transceiver 1214 for UE 110, only one processor 1220, one memory unit 1222, one transceiver 1224, and one communication (Comm) unit 1226 for access network 120, only one processor 1230, one memory unit 1232, and one communication unit 1234 for E-CSCF 254, and only one processor 1240, one memory unit 1242, and one communication unit 1244 for location server 286. In general, each entity may include any number of processors, memory units, transceivers, communication units, controllers, and so on.

On the downlink, base stations and/or access points in access network 120 transmit traffic data, signaling, and pilot to UEs within their coverage area. These various types of data are processed by processor 1220 and conditioned by transceiver 1224 to generate a downlink signal, which is transmitted via an antenna. At UE 110, the downlink signals from base stations and/or access points are received via an antenna, conditioned by transceiver 1214, and processed by processor 1210 to obtain various types of information for location, VoIP, and other services. For example, processor 1210 may decode messages used for the message flows described above. Memory units 1212 and 1222 store program codes and data for UE 110 and access network 120, respectively. On the uplink, UE 110 may transmit traffic data, signaling, and pilot to base stations and/or access points in access network 120. These various types of data are processed by processor 1210 and conditioned by transceiver 1214 to generate an uplink signal, which is transmitted via the UE antenna. At access network 120, the uplink signals from UE 110 and other UEs are received and conditioned by transceiver 1224 and further processed by processor 1220 to obtain various types of information (e.g., data, signaling, reports, and so on). Access network 120 communicates with E-CSCF 254 and other entities via communication unit 1226.

Within E-CSCF 254, processor 1230 performs processing for the E-CSCF, memory unit 1232 stores program codes and data for the E-CSCF, and communication unit 1234 allows the E-CSCF to communicate with other entities. Processor 1230 may perform processing for E-CSCF 254 for the message flows described above.

Within location server 286, processor 1240 performs location and/or positioning processing for the location server, memory unit 1242 stores program codes and data for the location server, and communication unit 1244 allows the location server to communicate with other entities. Processor 1240 may perform processing for the location server for the message flows described above.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 1212, 1222, 1232, and/or 1242 in FIG. 12) and executed by a processor (e.g., processor 1210, 1220, 1230, and/or 1240). The memory may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method for establishing a packet-based emergency call by a user equipment (UE), comprising:
   performing network attach with a radio access network (RAN) for packet-based access, wherein performing the network attach comprises transmitting a message comprising a first emergency services indication;
   performing a registration with a home network in order to perform an emergency call, wherein performing the registration comprises transmitting a session initiation protocol (SIP) REGISTER to a Proxy Call Session Control Function (P-CSCF) in a serving network, wherein the SIP REGISTER comprises a second emergency services indication and a UE identifier; and
   after receiving an indication that the registration is successful, establishing a packet-based call, using the packet-based access, to perform the emergency call, wherein establishing the packet-based call comprises transmitting a SIP INVITE to the P-CSCF in the serving network, wherein the SIP INVITE comprises a third emergency services indication and location information of the UE, and wherein the SIP INVITE is forwarded to an Emergency CSCF (E-CSCF) in the serving network.

2. The method of claim 1, wherein the SIP REGISTER is forwarded to a Serving CSCF (S-CSCF) in the home network.

3. The method of claim 1, wherein performing the network attach comprises performing a General Packet Radio Service (GPRS) attach.

4. The method of claim 1, wherein the packet-based call is established without authentication of the UE.

5. A user equipment (UE) for establishing a packet-based emergency call, comprising:
at least one processor configured to:
perform network attach with a radio access network (RAN) for packet-based access, wherein performing the network attach comprises transmitting, via a transceiver, a message comprising a first emergency services indication;
perform a registration with a home network in order to perform an emergency call, wherein performing the registration comprises transmitting, via the transceiver, a session initiation protocol (SIP) REGISTER to a Proxy Call Session Control Function (P-CSCF) in a serving network, wherein the SIP REGISTER comprises a second emergency services indication and a UE identifier; and
after receiving, via the transceiver, an indication that the registration is successful, establish, via the transceiver, a packet-based call, using the packet-based access, to perform the emergency call, wherein establishing the packet-based call comprises transmitting, via the transceiver, a SIP INVITE to the P-CSCF in the serving network, wherein the SIP INVITE comprises a third emergency services indication and location information of the UE, and wherein the SIP INVITE is forwarded to an Emergency CSCF (E-CSCF) in the serving network; and
a memory coupled with the at least one processor.

6. The UE of claim 5, wherein the SIP REGISTER is forwarded to a Serving CSCF (S-CSCF) in the home network.

7. The UE of claim 5, wherein the at least one processor is configured to perform the network attach by performing a General Packet Radio Service (GPRS) attach.

8. The UE of claim 5, wherein the at least one processor establishes, via the transceiver, the packet-based call without authentication of the UE.

9. A user equipment (UE) for establishing a packet-based emergency call, comprising:
means for performing network attach with a radio access network (RAN) for packet-based access, wherein the means for performing the network attach comprises means for transmitting a message comprising a first emergency services indication;
means for performing a registration with a home network in order to perform an emergency call, wherein the means for performing the registration comprises means for transmitting a session initiation protocol (SIP) REGISTER to a Proxy Call Session Control Function (P-CSCF) in a serving network, wherein the SIP REGISTER comprises a second emergency services indication and a UE identifier; and
means for establishing, after receiving an indication that the registration is successful, a packet-based call, using the packet-based access, to perform the emergency call, wherein the means for establishing the packet-based call comprises means for transmitting a SIP INVITE to the P-CSCF in the serving network, wherein the SIP INVITE comprises a third emergency services indication and location information of the UE, and wherein the SIP INVITE is forwarded to an Emergency CSCF (E-CSCF) in the serving network.

10. The UE of claim 9, wherein the SIP REGISTER is forwarded to a Serving CSCF (S-CSCF) in the home network.

11. The UE of claim 9, wherein the means for performing the network attach comprises means for performing a General Packet Radio Service (GPRS) attach.

12. The UE of claim 9, wherein the means for establishing the packet-based call comprises means for establishing the packet-based call without authentication of the UE.

13. A non-transient, computer-readable medium, having instructions, stored thereon, for establishing a wireless, packet-based emergency call by a user equipment (UE), comprising instructions to:
perform network attach with a radio access network (RAN) for packet-based access, wherein performing the network attach comprises transmitting a message comprising a first emergency services indication;
perform a registration with a home network in order to perform an emergency call, wherein performing the registration comprises transmitting a session initiation protocol (SIP) REGISTER to a Proxy Call Session Control Function (P-CSCF) in a serving network, wherein the SIP REGISTER comprises a second emergency services indication and a UE identifier; and
after receiving an indication that the registration is successful, establish a packet-based call, using the packet-based access, to perform the emergency call, wherein establishing the packet-based call comprises transmitting a SIP INVITE to the P-CSCF in the serving network, wherein the SIP INVITE comprises a third emergency services indication and location information of the UE, and wherein the SIP INVITE is forwarded to an Emergency CSCF (E-CSCF) in the serving network.

14. The computer-readable medium of claim 13, wherein the SIP REGISTER is forwarded to a Serving CSCF (S-CSCF) in the home network.

15. The computer-readable medium of claim 13, wherein the instructions to perform the network attach comprise instructions to perform a General Packet Radio Service (GPRS) attach.

16. The computer-readable medium of claim 13, wherein the instructions to establish the packet-based call comprise instructions for establishing the packet-based call without authentication of the UE.

* * * * *